(12) United States Patent
Ishigooka et al.

(10) Patent No.: US 10,780,894 B2
(45) Date of Patent: Sep. 22, 2020

(54) VEHICLE CONTROL DEVICE AND VEHICLE CONTROL SYSTEM

(71) Applicant: Hitachi Automotive Systems, Ltd., Hitachinaka-shi, Ibaraki (JP)

(72) Inventors: Tasuku Ishigooka, Tokyo (JP); Satoshi Otsuka, Tokyo (JP); Kohei Sakurai, Ibaraki (JP)

(73) Assignee: HITACHI AUTOMOTIVE SYSTEMS, LTD., Hitachinaka-Shi (JP)

(*) Notice: Subject to any disclaimer, the term of this patent is extended or adjusted under 35 U.S.C. 154(b) by 291 days.

(21) Appl. No.: 15/761,179

(22) PCT Filed: Oct. 19, 2016

(86) PCT No.: PCT/JP2016/080890
§ 371 (c)(1),
(2) Date: Mar. 19, 2018

(87) PCT Pub. No.: WO2017/073415
PCT Pub. Date: May 4, 2017

(65) Prior Publication Data
US 2018/0257662 A1 Sep. 13, 2018

(30) Foreign Application Priority Data
Oct. 26, 2015 (JP) .................. 2015-209750

(51) Int. Cl.
B60W 50/029 (2012.01)
H04L 12/28 (2006.01)
(Continued)

(52) U.S. Cl.
CPC ......... *B60W 50/029* (2013.01); *B60R 16/023* (2013.01); *B60R 16/0231* (2013.01);
(Continued)

(58) Field of Classification Search
CPC .... B60W 50/029; B60W 50/14; B60W 30/06; B60W 50/023; G06F 11/2035;
(Continued)

(56) References Cited

U.S. PATENT DOCUMENTS 5,828,972 A * 10/1998 Asanuma ............... B62D 5/006
701/41
6,463,373 B2 * 10/2002 Suganuma .......... B60R 16/0232
303/112
(Continued)

FOREIGN PATENT DOCUMENTS

EP 2518627 A2 10/2012
JP 2002-221075 A 8/2002
(Continued)

OTHER PUBLICATIONS

Japanese Office Action dated Feb. 5, 2019 in Japanese Patent Application No. 2015-209750 with its English translation.
(Continued)

*Primary Examiner* — Jaime Figueroa
(74) *Attorney, Agent, or Firm* — Foley & Lardner LLP

(57) ABSTRACT

The purpose of the present invention is to provide a vehicle control technique that enables the safety of function substitution to be increased. This vehicle control device determines whether a substitution was successful by monitoring the operations which follow initiation of the substitution.

11 Claims, 30 Drawing Sheets

(51) Int. Cl.
  *B60R 16/023* (2006.01)
  *G06F 11/07* (2006.01)
  *G06F 11/20* (2006.01)
  *B60W 50/023* (2012.01)
  *B60W 30/06* (2006.01)
  *B60W 50/14* (2020.01)
  *G08G 1/00* (2006.01)

(52) U.S. Cl.
  CPC .......... *B60W 30/06* (2013.01); *B60W 50/023* (2013.01); *B60W 50/14* (2013.01); *G06F 11/0739* (2013.01); *G06F 11/0793* (2013.01); *G06F 11/2028* (2013.01); *G06F 11/2035* (2013.01); *H04L 12/28* (2013.01); *G08G 1/00* (2013.01)

(58) Field of Classification Search
  CPC ............. G06F 11/0793; G06F 11/2028; G06F 11/0739; B60R 16/023; B60R 16/0231; H04L 12/28; G08G 1/00
  USPC ..................................................... 701/1, 29.2
  See application file for complete search history.

(56) References Cited

U.S. PATENT DOCUMENTS

| | | | | |
|---|---|---|---|---|
| 6,687,590 | B2 * | 2/2004 | Kifuku | B62D 5/0481 701/43 |
| 6,904,346 | B2 * | 6/2005 | Higashi | B62D 5/001 180/443 |
| 7,130,728 | B2 * | 10/2006 | Suzuki | B60T 8/885 701/41 |
| 8,358,578 | B2 * | 1/2013 | Murashige | H04L 12/40176 370/225 |
| 9,517,696 | B2 * | 12/2016 | Zhou | B60L 1/003 |
| 9,692,345 | B2 * | 6/2017 | Masuda | B60L 3/0084 |
| 9,783,227 | B2 * | 10/2017 | Shimizu | B62D 5/04 |
| 2002/0093298 | A1 * | 7/2002 | Walter | B60T 7/042 318/34 |
| 2002/0099487 | A1 * | 7/2002 | Suganuma | B60R 16/0232 701/48 |
| 2003/0098197 | A1 * | 5/2003 | Laurent | B62D 5/003 180/401 |
| 2004/0193344 | A1 * | 9/2004 | Suzuki | B60T 8/885 701/41 |
| 2009/0262000 | A1 * | 10/2009 | Kanazawa | B60R 16/0231 341/176 |
| 2012/0065823 | A1 * | 3/2012 | Taguchi | B60L 3/0061 701/22 |
| 2012/0265405 | A1 | 10/2012 | Matsumura | |
| 2012/0271513 | A1 * | 10/2012 | Yoneda | B62D 5/0484 701/41 |
| 2012/0272091 | A1 * | 10/2012 | Sekiguchi | G06F 11/0712 714/3 |
| 2016/0006388 | A1 * | 1/2016 | Masuda | B60L 3/0084 318/51 |
| 2017/0220035 | A1 | 8/2017 | Naoi et al. | |

FOREIGN PATENT DOCUMENTS

| | | |
|---|---|---|
| JP | 2010-136286 A | 6/2010 |
| JP | 2013-084284 A | 5/2013 |
| WO | WO-98/26958 A1 | 6/1998 |
| WO | WO-2015/129311 A1 | 9/2015 |

OTHER PUBLICATIONS

International Search Report with English translation and Written Opinion issued in corresponding application No. PCT/JP2016/080890 dated Jan. 24, 2017.

Supplementary European Search Report dated Jun. 7, 2019 in European Patent Application No. 16859645.0.

* cited by examiner

| STATE OF AUTOMATIC DRIVING INTEGRATED ECU |
|---|
| 0 |

| ACTION ID | DISTANCE [m] | CURVATURE |
|---|---|---|
| 0 | 300 | 0 |
| 1 | 100 | 10% |
| 2 | 1600 | 0 |
| ⋮ | ⋮ | ⋮ |

FIG. 9

| ACTION ID | DISTANCE [m] | CURVATURE |
|---|---|---|
| 0 | 297 | 0 |
| 1 | 100 | 10% |
| 2 | 1600 | 0 |
| ⋮ | ⋮ | ⋮ |

FIG. 10

| FUNCTION ID | ALLOWABLE THRESHOLD | REMARKS |
|---|---|---|
| 0 | 3 | AUTOMATIC DRIVING INTEGRATED ECU |
| ⋮ | ⋮ | ⋮ |

| ERROR COUNTER |
|---|
| 0 |

FIG. 12

| DATA ID | DATA VALUE | TRANSMISSION REQUEST FLAG | REMARKS |
|---|---|---|---|
| 100 | 0 | 0 | REQUEST INFORMATION OF FUNCTION SUBSTITUTION |
| 200 | 0 | 0 | DETERMINATION RESULT OF FUNCTION SUBSTITUTION |
| ⋮ | ⋮ | ⋮ | ⋮ |

FIG. 13

| TRANSMISSION REQUEST FLAG |
|---|
| 0 |

VEHICLE CONTROL DEVICE AND VEHICLE CONTROL SYSTEM

TECHNICAL FIELD

The present invention relates to a technology for controlling a vehicle.

BACKGROUND ART

In recent years, many vehicle control systems include an electronic control unit (ECU) which operates electronic vehicle control instruments, and an in-vehicle network (local area network) which enables communication between ECUs.

In addition, in recent years, there has been an increasing demand for an automatic driving system which automatically carries a vehicle to a destination, without a driver's access, brake, or steering operation. In the automatic driving system, it is necessary to ensure sufficient safety even when an automatic driving integrated ECU which takes over the driver's determination fails. Which state is safe depends on a driving environment. For example, it can be said that it is safe to keep driving without stopping in harsh environments such as expressways or extreme cold areas.

Redundancy of functions is known as a method for keeping an automobile driving even when an ECU fails. The redundancy is a method for preparing two or more ECUs having the same function and switching to the other when one is broken. For example, it is conceivable that only one ECU transmits a control command value to an in-vehicle network in a normal state and the other ECU transmits a control command value to the in-vehicle network when the ECU is broken. However, this method has a problem that cost increases because two ECUs must be prepared.

Function substitution is known as another method for keeping an automobile driving even when an ECU fails. In PTL 1, when a failure of an ECU is detected, a substitution destination of the function of the failed ECU is selected, and a function program of the failed ECU is transmitted to the substitution destination. The substitution destination ECU substitutes the function of the failed ECU by using the function program. Therefore, high reliability is realized without providing a new ECU.

CITATION LIST

Patent Literature

PTL 1: JP 2002-221075 A

SUMMARY OF INVENTION

Technical Problem

In the technique disclosed in PTL 1, when a substitution destination ECU is selected, an appropriate ECU is selected from limited information. However, if the substitution destination ECU is selected based on the limited information, it is impossible to know whether the ECU can reliably substitutes the function.

The present invention has been made in an effort to solve the above problems, and an object of the present invention is to provide a vehicle control technique capable of enhancing the safety of function substitution.

Solution to Problem

A vehicle control device according to the present invention determines whether a substitution is successful by monitoring an operation after starting the substitution.

Advantageous Effects of Invention

According to a vehicle control device of the present invention, since the success or failure of a substituted function can be determined, the safety after function substitution can be secured.

BRIEF DESCRIPTION OF DRAWINGS

FIG. 8 is an example of an original data buffer 1142 and traveling track data 1241.
FIG. 9 is an example of a substitution data buffer 1143 and traveling track data 1341.
FIG. 10 is an example of a comparison table 1144.
FIG. 11 is an example of an error counter 1145.
FIG. 12 is an example of a transmission buffer 1146.
FIG. 13 is an example of a transmission request flag 1242.

DESCRIPTION OF EMBODIMENTS

First Embodiment

Figure 1:
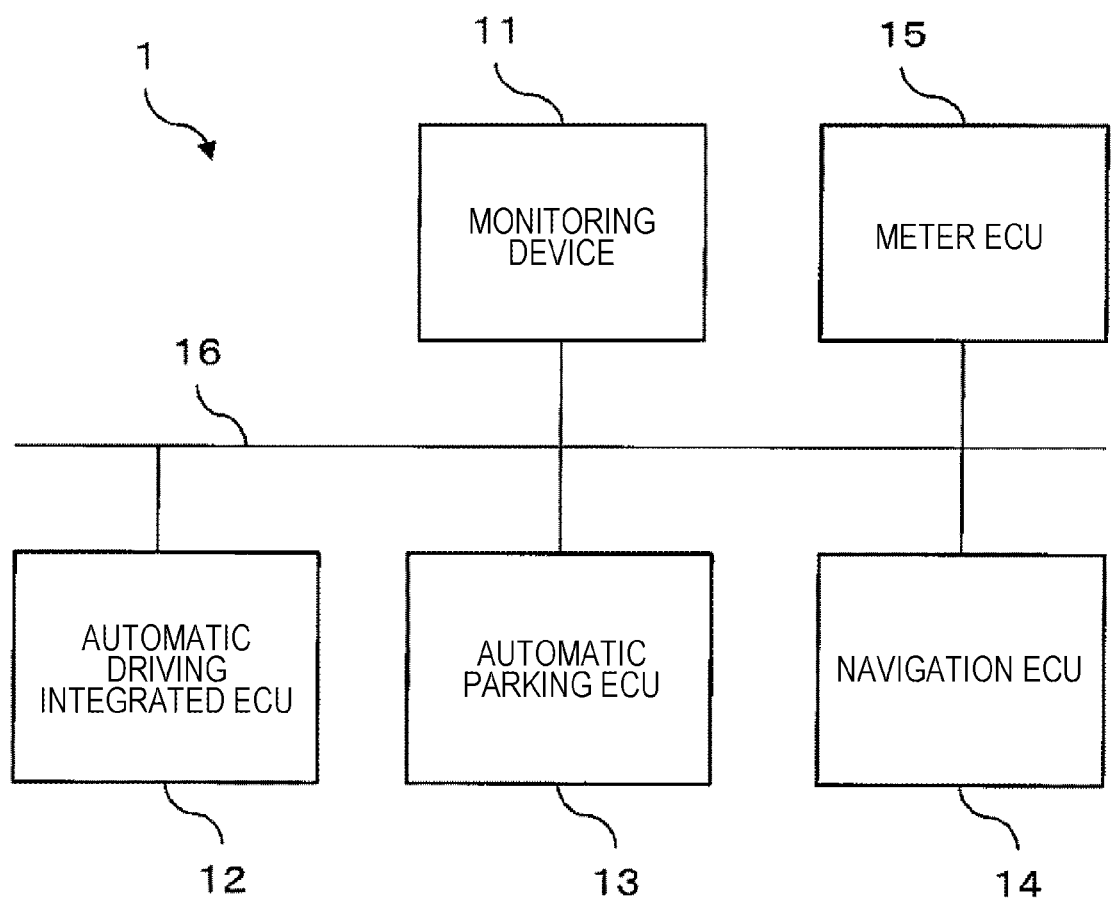
FIG. 1 is a configuration diagram of a vehicle control system 1 according to a first embodiment.

FIG. 1 is a configuration diagram of a vehicle control system 1 according to a first embodiment of the present invention. The vehicle control system 1 includes a monitoring device 11, an automatic driving integrated ECU 12, an automatic parking ECU 13, a navigation ECU 14, a meter ECU 15, and an in-vehicle network 16. The in-vehicle network 16 is a bus-type in-vehicle network such as controller area network (CAN), CAN-FD (flexible data), and FlexRay. A configuration of each device will be described in detail below.

In the following, for convenience of description, a program executed by a computing device may be explained as an operation subject, but it is noted that it is the computing device that actually executes the program.

Figure 2:
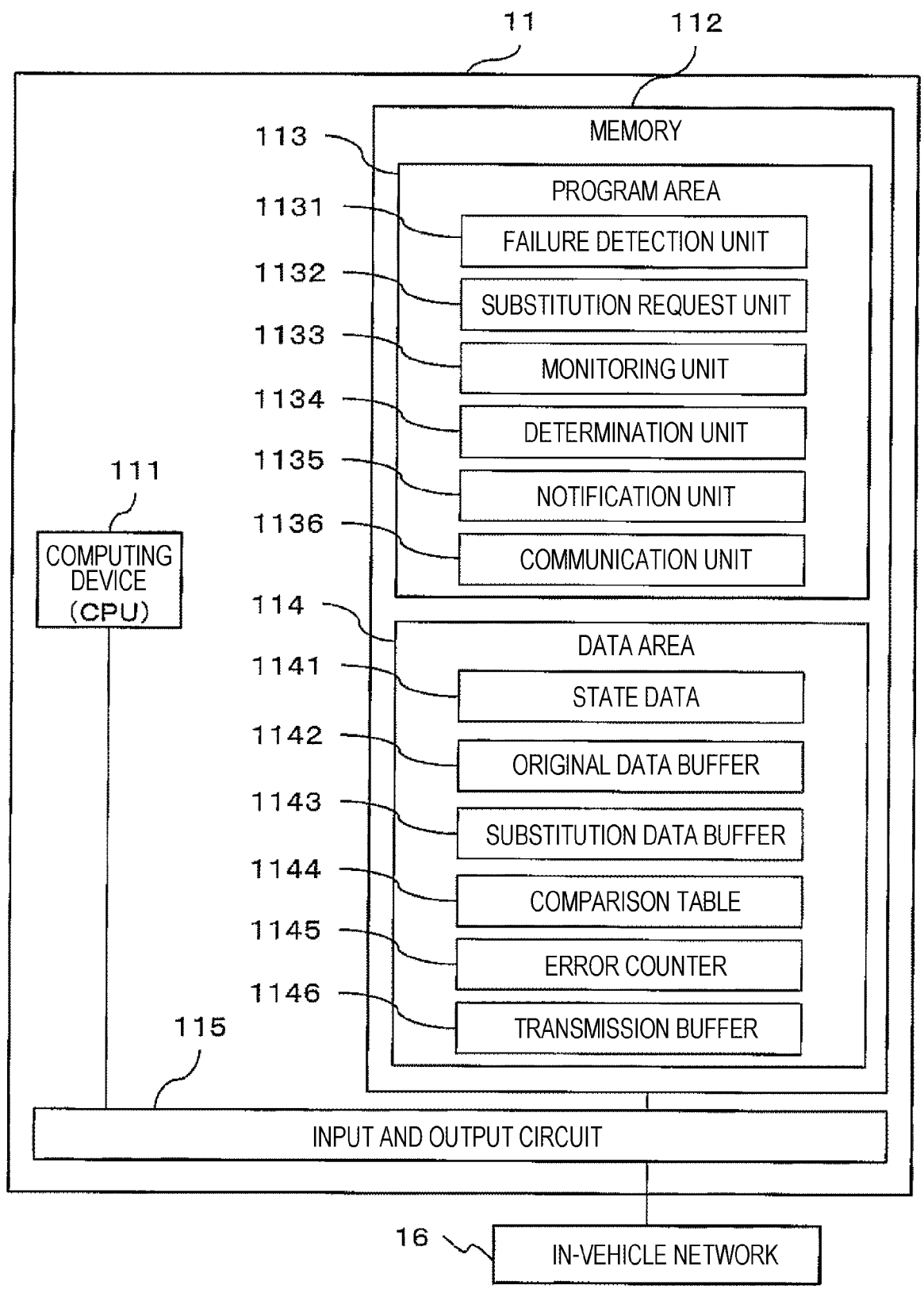
FIG. 2 is a configuration diagram of a monitoring device 11.

FIG. 2 is a configuration diagram of the monitoring device 11. The monitoring device 11 is a device which monitors a function substitution operation between ECUs. The monitoring device 11 includes a computing device (central processing unit: CPU) 111, a memory 112, and an input and output circuit 115. The memory 112 has a program area 113 and a data area 114 as storage areas. The CPU 111 can communicate with other devices through the input and output circuit 115 and the in-vehicle network 16.

The program area 113 stores a failure detection unit 1131, a substitution request unit 1132, a monitoring unit 1133, a determination unit 1134, a notification unit 1135, and a communication unit 1136 as programs executed by the CPU 111. The data area 114 stores state data 1141, an original data buffer 1142, a substitution data buffer 1143, a comparison table 1144, an error counter 1145, and a transmission buffer 1146. Details of each functional unit and data will be described below.

Figure 3:
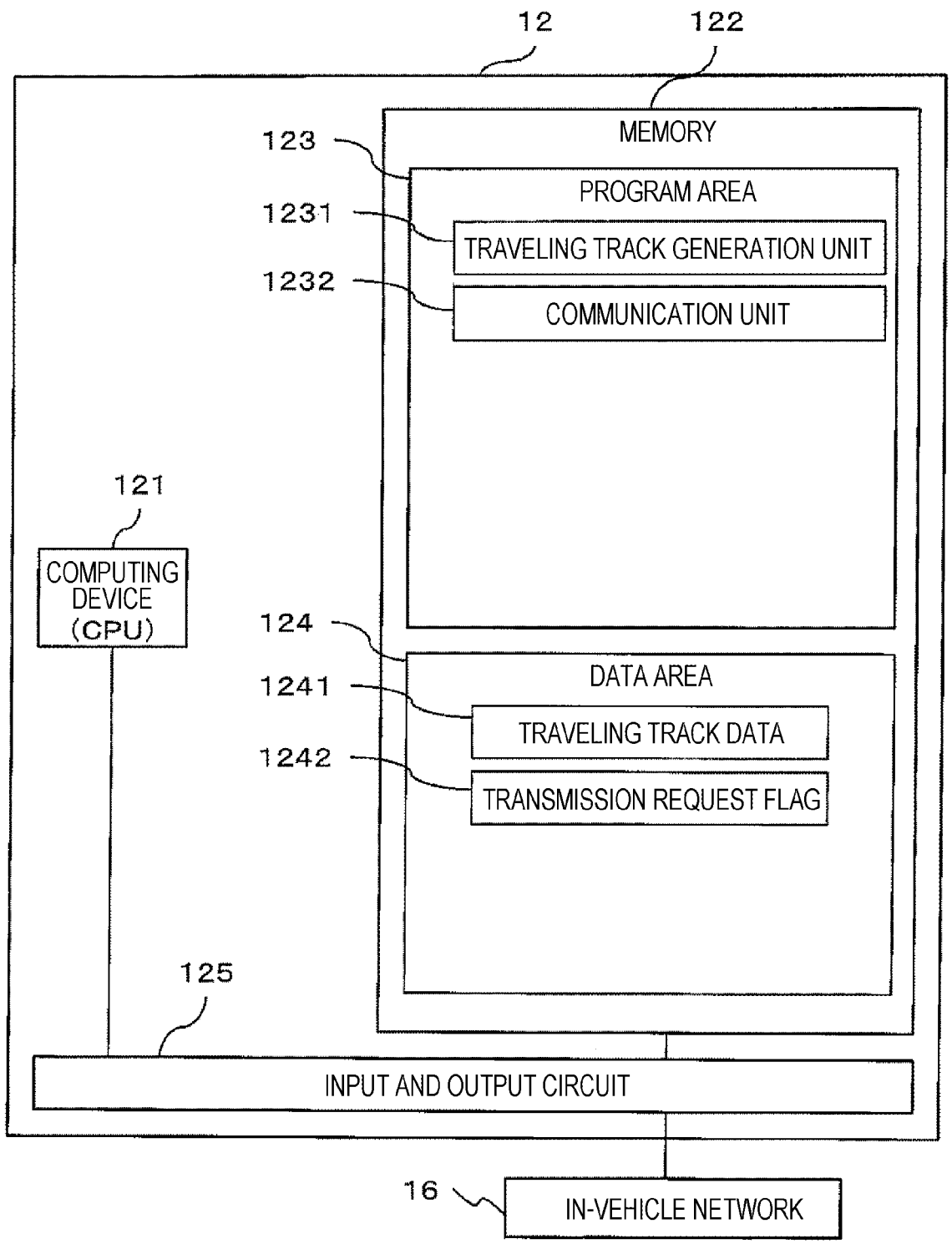
FIG. 3 is a configuration diagram of an automatic driving integrated ECU 12.

FIG. 3 is a configuration diagram of the automatic driving integrated ECU 12. The automatic driving integrated ECU 12 is an ECU which controls automatic driving of a vehicle equipped with the vehicle control system 1. The automatic driving integrated ECU 12 includes a computing device (CPU) 121, a memory 122, and an input and output circuit 125. The memory 122 has a program area 123 and a data area 124 as storage areas. The CPU 121 can communicate with other devices through the input and output circuit 125 and the in-vehicle network 16.

The program area 123 stores a traveling track generation unit 1231 and a communication unit 1232 as programs executed by the CPU 121. The data area 124 stores traveling track data 1241 and a transmission request flag 1242. Details of each functional unit and data will be described below.

Figure 4:
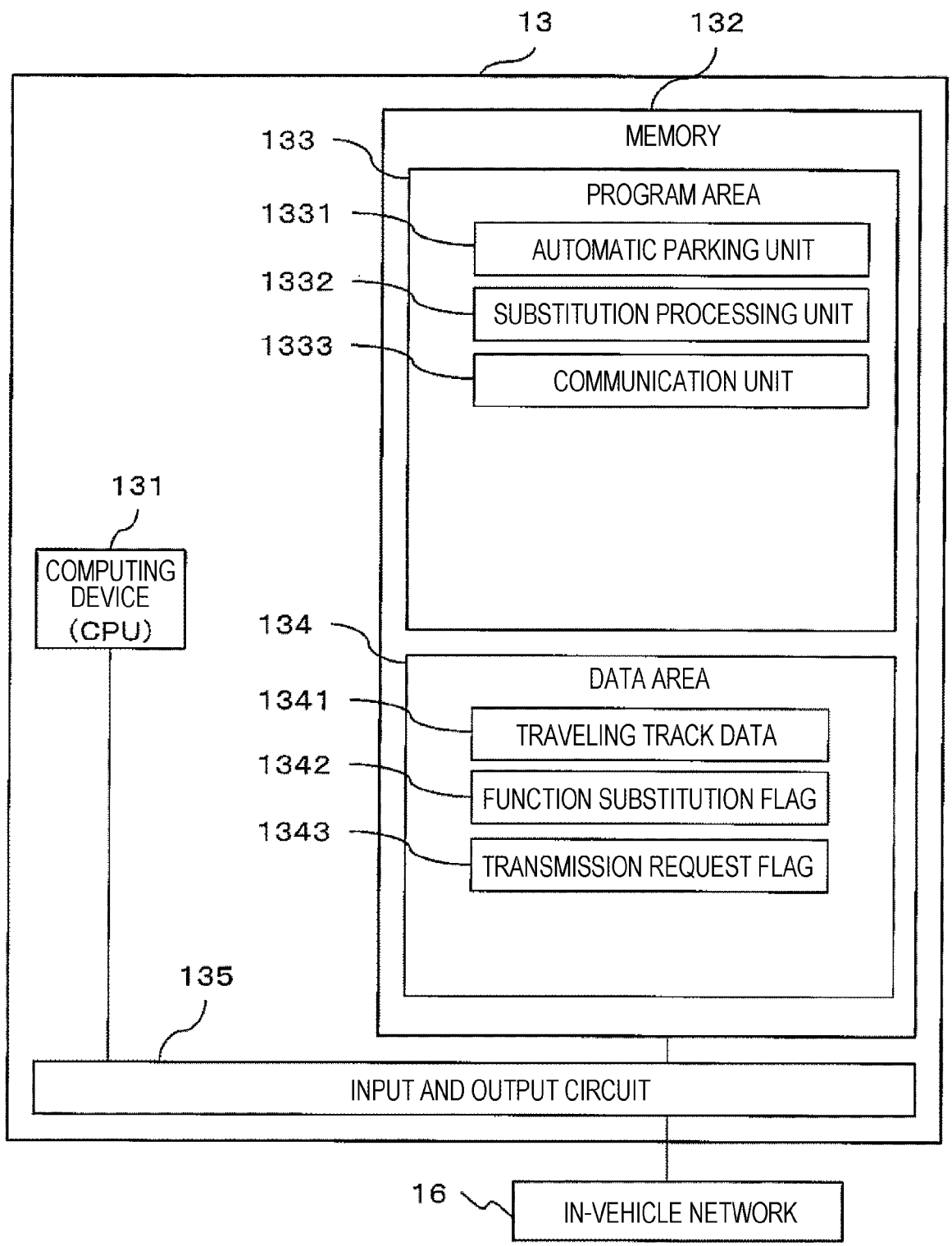
FIG. 4 is a configuration diagram of an automatic parking ECU 13.

FIG. 4 is a configuration diagram of the automatic parking ECU 13. The automatic parking ECU 13 is an ECU which controls automatic parking of the vehicle equipped with the vehicle control system 1. The automatic parking ECU 13 includes a computing device (CPU) 131, a memory 132, and an input and output circuit 135. The memory 132 has a program area 133 and a data area 134 as storage areas. The CPU 131 can communicate with other devices through the input and output circuit 135 and the in-vehicle network 16.

The program area 133 stores an automatic parking unit 1331, a substitution processing unit 1332, and a communication unit 1333 as programs executed by the CPU 131. The data area 134 stores traveling track data 1341, a function substitution flag 1342, and a transmission request flag 1343. Details of each functional unit and data will be described below.

Figure 5:
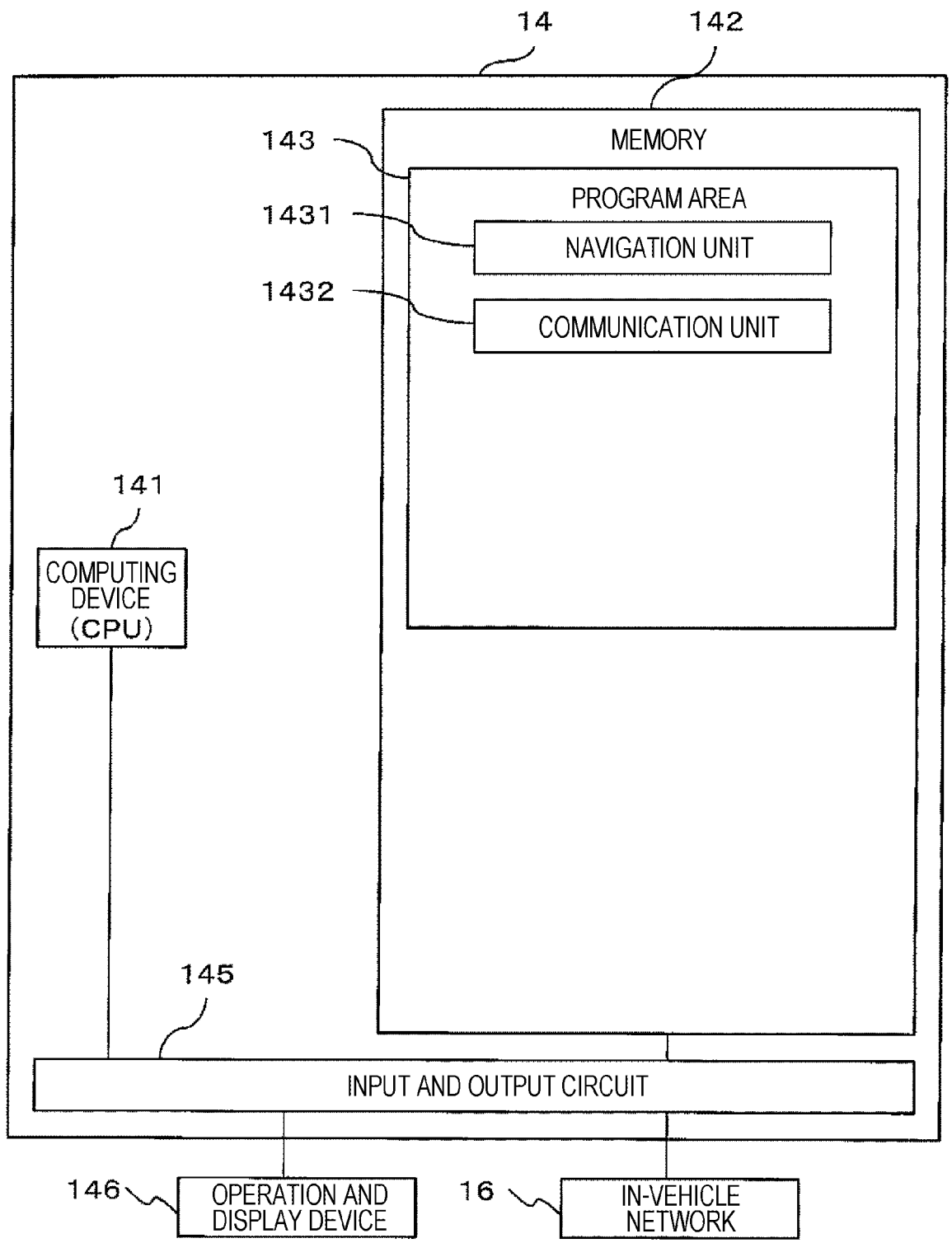
FIG. 5 is a configuration diagram of a navigation ECU 14.

FIG. 5 is a configuration diagram of the navigation ECU 14. The navigation ECU 14 is an ECU which provides a car navigation function of the vehicle equipped with the vehicle control system 1. The navigation ECU 14 includes a computing device (CPU) 141, a memory 142, and an input and output circuit 145. The memory 142 has a program area 143 as a storage area. The CPU 141 can communicate with other devices through the input and output circuit 145 and the in-vehicle network 16 and can control an operation and display device 146. The operation and display device 146 is a device for performing the operation or screen display of the car navigation.

The program area 143 stores a navigation unit 1431 and a communication unit 1432 as programs executed by the CPU 141. Details of each functional unit will be described below.

Figure 6:
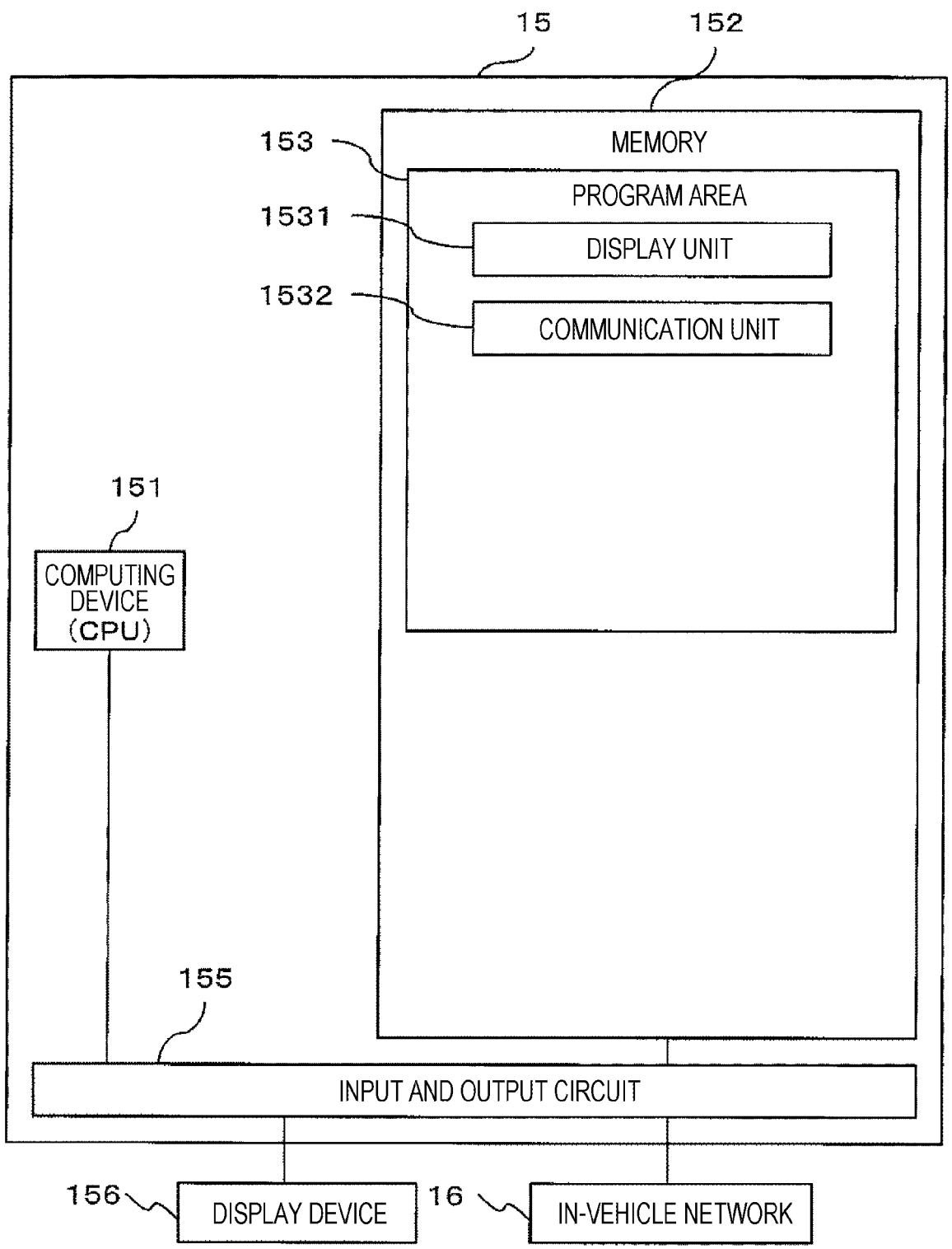
FIG. 6 is a configuration diagram of a meter ECU 15.

FIG. 6 is a configuration diagram of the meter ECU 15. The meter ECU 15 is an ECU which controls measuring instruments of the vehicle equipped with the vehicle control system 1. The meter ECU 15 includes a computing device (CPU) 151, a memory 152, and an input and output circuit 155. The memory 152 has a program area 153 as a storage area. The CPU 151 can communicate with other devices through the input and output circuit 155 and the in-vehicle network 16 and can control a display device 156. The display device 156 is a device which displays screens of the measuring instruments.

The program area 153 stores a display unit 1531 and a communication unit 1532 as programs executed by the CPU 151. Details of each functional unit will be described below.

Figure 7:
FIG. 7 is an example of state data 1141.

FIG. 7 is an example of the state data 1141. The state data 1141 indicates the state of the automatic driving integrated ECU 12. When the state data 1141 is 0, it is indicated that no failure of the automatic driving integrated ECU 12 has occurred, and when the state data 1141 is 1, it is indicated that the failure of the automatic driving integrated ECU 12 has occurred.

FIG. 8 is an example of the original data buffer 1142 and the traveling track data 1241. The traveling track data 1241 is data representing a traveling plan describing an operation sequence when the vehicle automatically travels and is created by the automatic driving integrated ECU 12. The original data buffer 1142 is data in which the traveling track data 1241 is stored according to a procedure to be described below. Therefore, since these have the same configuration, each data field of the original data buffer 1142 will be described below.

An action ID 11421 is the number of the operation sequence, and the vehicle performs the operation, for example, in ascending order of numbers. A distance 11422 is a distance traveled in the sequence of the corresponding number. A curvature 11423 is a traveling angle in the sequence of the corresponding number. For example, when the curvature 11423 is 0% and the distance 11422 is 300, it indicates going straight 300 meters.

The automatic driving integrated ECU 12 creates a traveling plan up to a next cycle, for example, at predetermined intervals. Since the surrounding environment of the vehicle varies from moment to moment, the automatic driving integrated ECU 12 sequentially creates the traveling track data 1241 while reflecting a situation at that point in each cycle.

Figure 9:
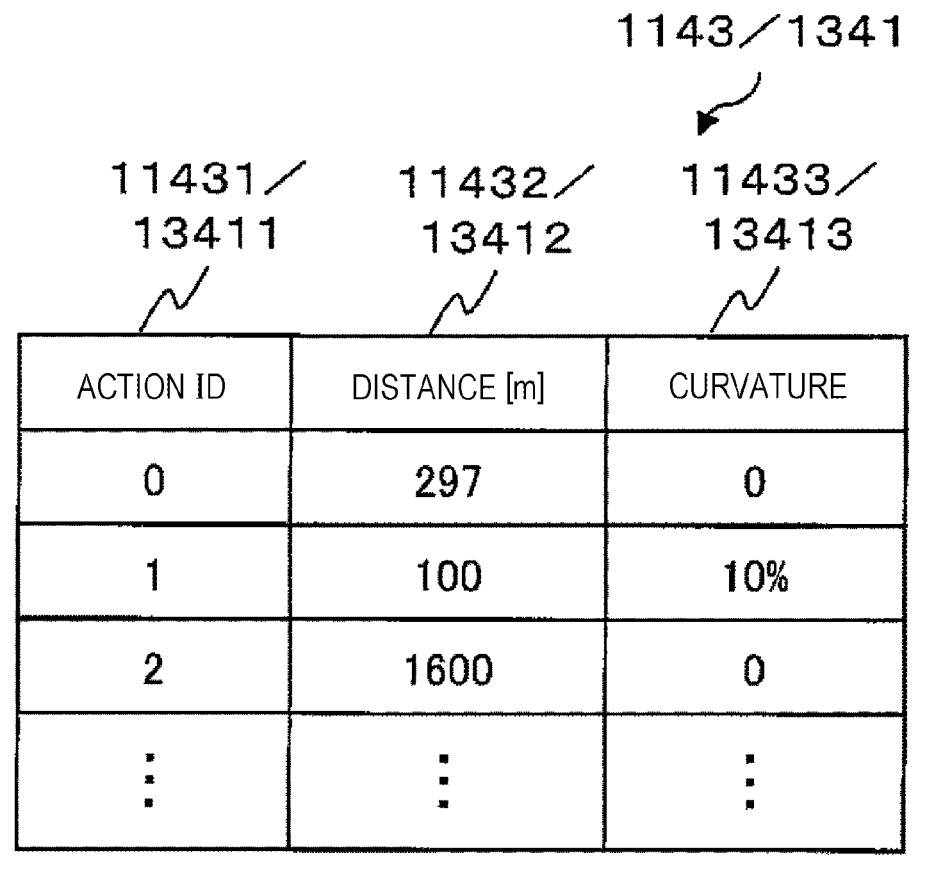

FIG. 9 is an example of the substitution data buffer 1143 and the traveling track data 1341. The traveling track data 1341 is data representing a traveling plan of automatic driving created by the automatic parking ECU 13 in place of the automatic driving integrated ECU 12. The substitution data buffer 1143 is data in which the traveling track data 1341 is stored according to a procedure to be described below. Therefore, these have the same configuration as the traveling track data 1241.

FIG. 10 is an example of the comparison table 1144. The comparison table 1144 is a data table which specifies a range permitted as a difference between a control parameter before the function substitution and a control parameter after the function substitution for each control function included in the vehicle control system 1. A function ID 11441 represents a type of a control function included in the vehicle control system 1. For example, 0 indicates the automatic driving integrated ECU 12. An allowable threshold value 11442 indicates a value allowed as a difference between the control parameter calculated by the ECU before the failure and the control parameter calculated by the substitution ECU after the failure.

In the data example illustrated in FIG. 10, the allowable threshold value 11442 relating to the control parameters calculated by the automatic driving integrated ECU 12 is exemplified. Specifically, a range allowed as a difference between a distance 11422 calculated before the automatic driving integrated ECU 12 fails and a distance 11432 calculated by the substitution of the automatic parking ECU 13 after the automatic driving integrated ECU 12 fails is specified. The monitoring unit 1133 determines the success or failure of the substitution by checking whether the difference between the control parameters respectively calculated by the ECU before the occurrence of the failure and the function substitution ECU is within the allowable threshold value 11442.

Since it is considered that the vehicle continues to move during the period from the occurrence of the failure of the ECU to the start of the function substitution, it is necessary to set the allowable threshold value 11442 in consideration of this. For example, if the time from the detection of the failure of the automatic driving integrated ECU 12 to the start of the function substitution is 100 ms, a car traveling at 100 km/h travels about 2.8 meters in 100 ms. Then, a distance 13412 to be calculated by the automatic parking ECU 13 for the same action ID 13411 as the action ID 12411 is 2.8 meters less than the distance 12412. Therefore, it is desirable that the allowable threshold value 11442 relating to the automatic driving integrated ECU 12 is 2.8 meters or a numerical value with an appropriate coefficient or an error added thereto. In FIG. 10, it is set to 3 meters in consideration of a slight error.

FIG. 11 is an example of the error counter 1145. The error counter 1145 is data which records the number of times of failures when the automatic driving integrated ECU 12 has failed and the substitution is performed.

FIG. 12 is an example of the transmission buffer 1146. The transmission buffer 1146 is a buffer which temporarily accumulates data to be transmitted to the in-vehicle network 16 by the monitoring device 11. Each ECU can also include a similar buffer. The transmission buffer 1146 includes a data ID 11461, a data value 11462, and a transmission request flag 11463.

The data ID 11461 is a value which indicates a type of data transmitted and received on the in-vehicle network 16. For example, when the in-vehicle network 16 is a CAN, a CAN ID can be used as the data ID 11461. The data value 11462 indicates a data value transmitted to the in-vehicle network 16. When the transmission request flag 11463 is set, data is transmitted from the transmission buffer 1146 to the in-vehicle network 16.

FIG. 13 is an example of the transmission request flag 1242. When the transmission request flag 1242 is set, the traveling track data 1241 is transmitted to the in-vehicle network. The same applies to the transmission request flag 1343 and the traveling track data 1341.

Figure 14:
FIG. 14 is an example of a function substitution flag 1342.
Figure 14:
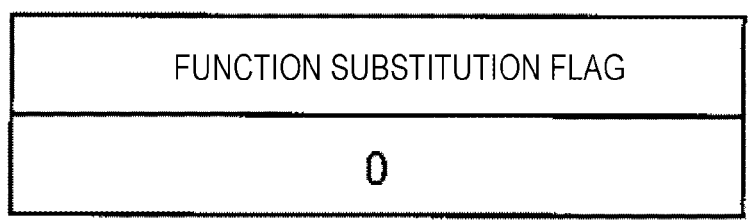

FIG. 14 is an example of the function substitution flag 1342. The function substitution flag 1342 is a flag which indicates whether the automatic parking ECU 13 performs substitution of a process of creating a traveling plan in place of the automatic driving integrated ECU 12.

Figure 15:
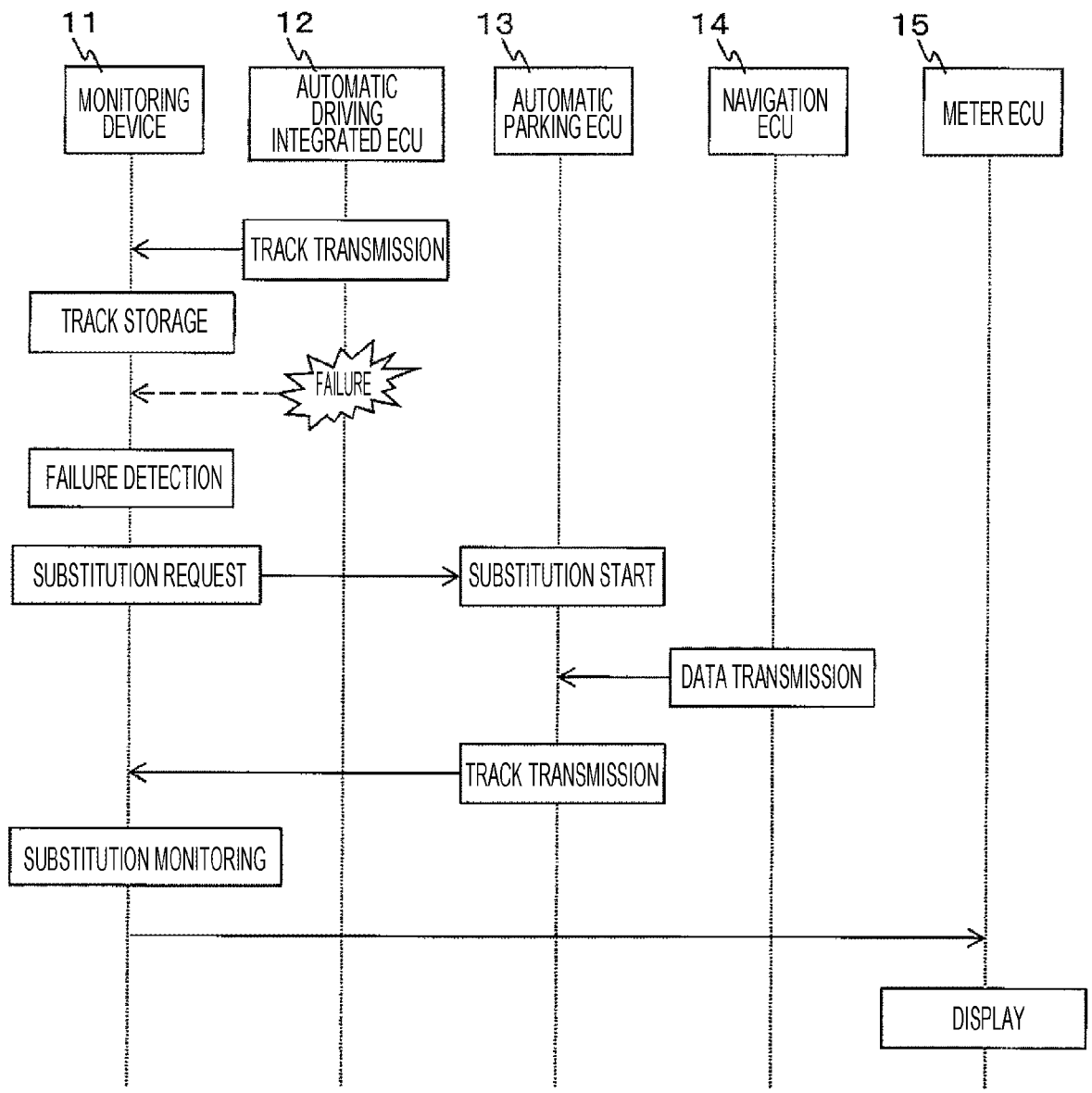
FIG. 15 is a sequence diagram describing the operation of the vehicle control system 1.

FIG. 15 is a sequence diagram describing the operation of the vehicle control system 1. Hereinafter, the overall operation of the vehicle control system 1 will be described with reference to FIG. 15, and individual detailed operations will be described with reference to FIG. 16 and subsequent drawings.

The automatic driving integrated ECU 12 transmits the traveling track data 1241 to the monitoring device 11. The transmission interval may be periodic, or may be returned in response to a request from the monitoring device 11. The monitoring device 11 stores the received traveling track data 1241 in the original data buffer 1142.

When the automatic driving integrated ECU 12 fails, the monitoring device 11 detects that the automatic driving integrated ECU 12 has failed. For example, if the periodically received traveling track data 1241 is not transmitted, it is determined that the automatic driving integrated ECU 12 has failed. The monitoring device 11 requests the automatic parking ECU 13 to create a traveling plan in place of the automatic driving integrated ECU 12. Upon receiving the request, the automatic parking ECU 13 starts substitution.

The navigation ECU 14 periodically transmits navigation data, such as destination/peripheral map/route, to the in-vehicle network 16. Since the in-vehicle network 16 is a bus type network, the automatic parking ECU 13 can also receive the navigation data received before the automatic driving integrated ECU 12 failed. The automatic parking ECU 13 creates the traveling track data 1341 by using the navigation data and the like received from the navigation ECU 14, and transmits the traveling track data 1341 to the monitoring device 11.

The monitoring device 11 compares the traveling track data 1241 calculated before the automatic driving integrated ECU 12 fails with the traveling track data 1341 calculated by the substitution of the automatic parking ECU 13, and determines whether the substitution is successful. The monitoring device 11 transmits the determination result to the meter ECU 15. The meter ECU 15 notifies a driver of the success or failure of the substitution by displaying the determination result on a screen.

Figure 16:
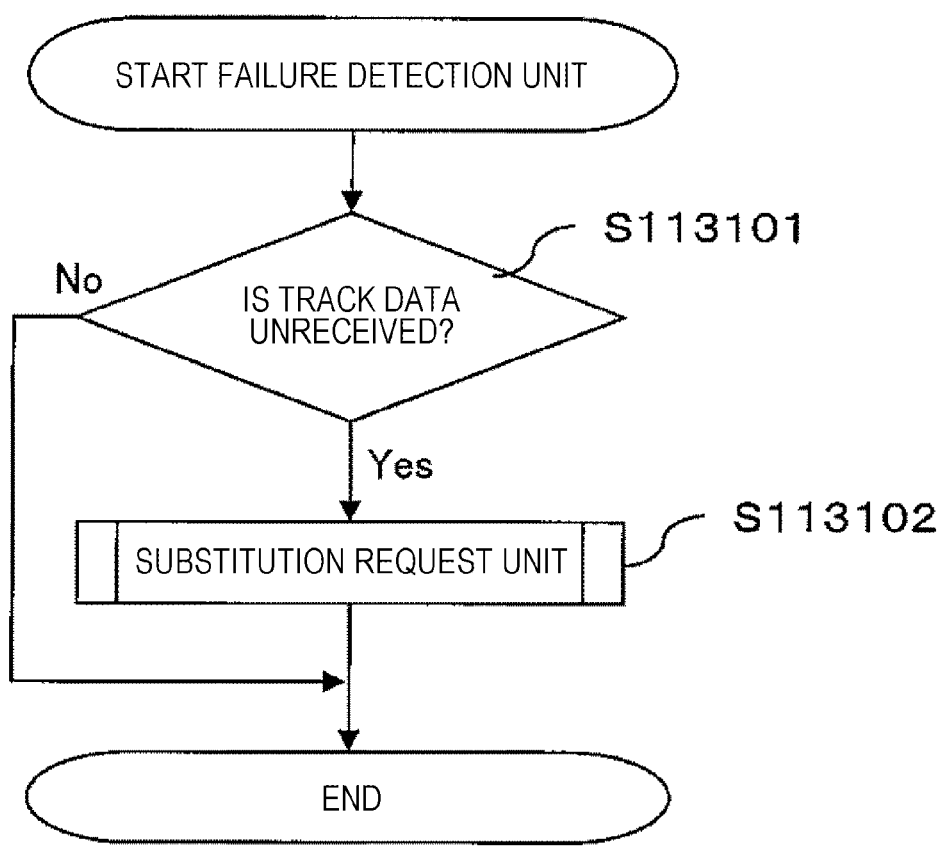
FIG. 16 is a flowchart describing an operation of a failure detection unit 1131.

FIG. 16 is a flowchart describing the operation of the failure detection unit 1131. Hereinafter, each step of FIG. 16 will be described.

(FIG. 16: Step S113101)

The failure detection unit 1131 determines whether the traveling track data 1241 could be received. For example, it is possible to distinguish whether the traveling track data 1241 could be received by an argument when calling the failure detection unit 1131 in FIG. 21 to be described below. If the traveling track data 1241 is not received, the process proceeds to step S113102, and if received, the present flowchart is ended.

(FIG. 16: Step S113102)

The failure detection unit 1131 calls the substitution request unit 1132. The substitution request unit 1132 has a role of requesting the automatic parking ECU 13 to perform substitution.

Figure 17:
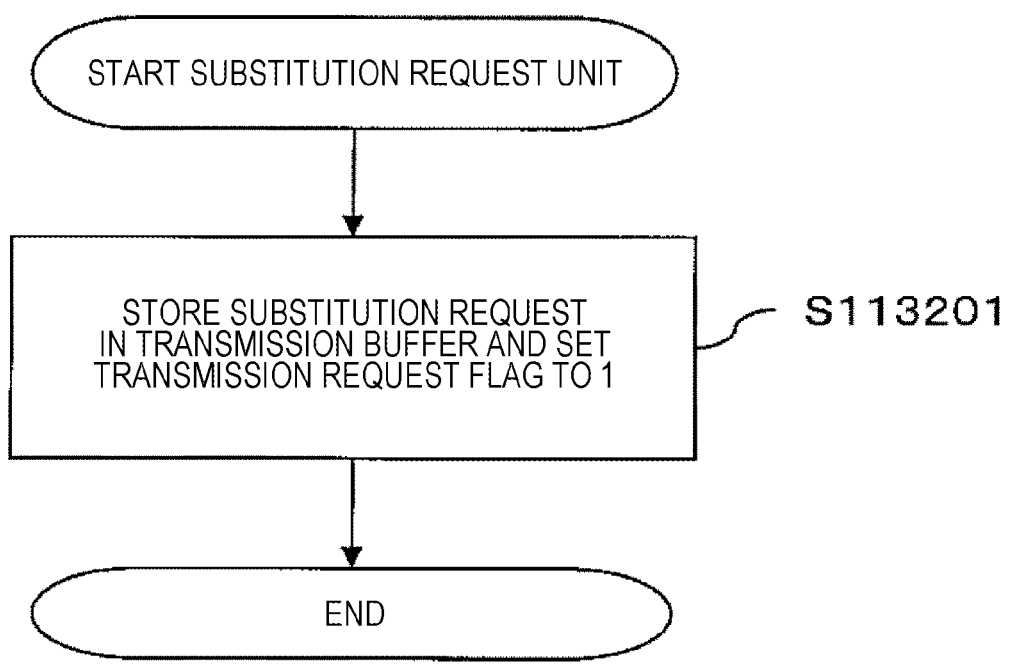
FIG. 17 is a flowchart describing an operation of a substitution request unit 1132.

FIG. 17 is a flowchart describing the operation of the substitution request unit 1132. Hereinafter, each step of FIG. 17 will be described.

(FIG. 17: Step S113201)

The substitution request unit 1132 stores data requesting the automatic parking ECU 13 to perform the substitution in the transmission buffer 1146 and sets the transmission request flag 11463 of the corresponding data to 1 (a value requesting transmission).

Figure 18:
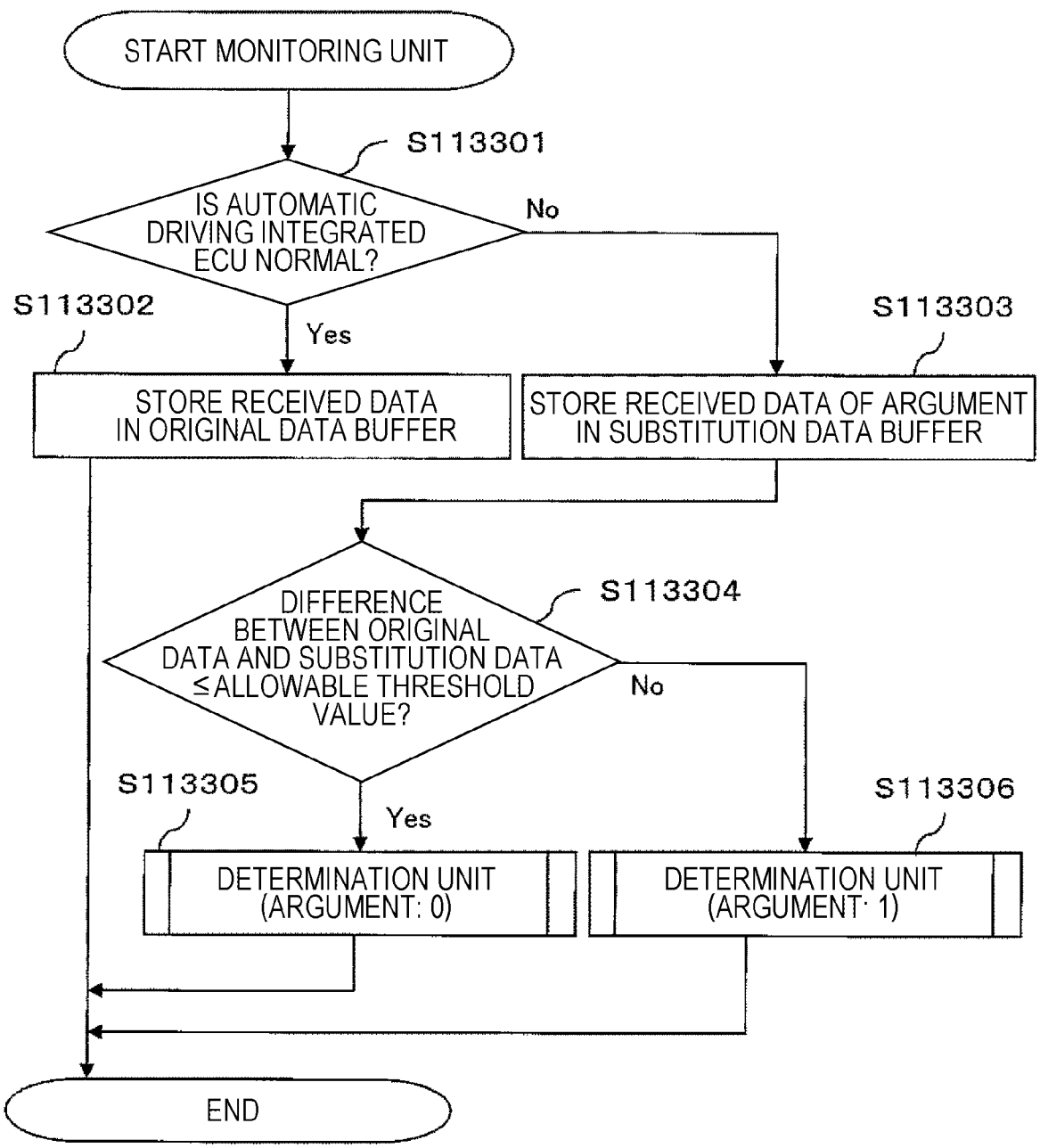
FIG. 18 is a flowchart describing an operation of a monitoring unit 1133.

FIG. 18 is a flowchart describing the operation of the monitoring unit 1133. Hereinafter, each step of FIG. 18 will be described.

(FIG. 18: Step S113301)

By checking the value of the state data 1141, the monitoring unit 1133 checks whether the automatic driving integrated ECU 12 is in a normal state. For example, when the value is 0, it is normal, and when the value is 1, it is abnormal. If it is normal, the process proceeds to step S113302, and if it is abnormal, the process proceeds to S113303.

(FIG. 18: Step S113302)

The monitoring unit 1133 stores the received traveling track data 1241 in the original data buffer 1142. The traveling track data 1241 can be delivered, for example, as an argument when calling the monitoring unit 1133.

(FIG. 18: Step S113303)

The monitoring unit 1133 stores the received traveling track data 1341 in the substitution data buffer 1143. The traveling track data 1341 can be delivered, for example, as an argument when calling the monitoring unit 1133.

(FIG. 18: Step S113304)

The monitoring unit 1133 compares the traveling track data 1241 stored in the original data buffer 1142 with the traveling track data 1341 stored in the substitution data buffer 1143 and checks whether a difference between both is within the allowable threshold value 11442. If it is within the threshold value, the process proceeds to step S113305; otherwise, the process proceeds to step S113306.

(FIG. 18: Step S113304: Supplement No. 1)

In this step, the success or failure of the substitution is determined according to whether the difference falls within the range of the allowable threshold value 11442, but the determination criteria is not limited thereto. For example, it may be determined based on whether the difference is equal to the assumed value.

(FIG. 18: Step S113304: Supplement No. 2)

When the traveling track data 1241 and 1341 are constituted by a plurality of operation steps (that is, a plurality of action IDs), the monitoring unit 1133 performs this step for each action ID corresponding to the traveling plan after a current time. When the difference with respect to any one of the action IDs exceeds the allowable threshold value 11442, it may be regarded as the failure of the substitution, and, for example, when the sum of the differences exceeds the allowable threshold value 11442, it may be regarded as the failure of the substitution.

(FIG. 18: Step S113305)

The monitoring unit 1133 calls the determination unit 1134. The argument to be delivered to the determination unit 1134 is a value (for example, 0) indicating that the difference in step S113304 is within the allowable threshold value 11442.

(FIG. 18: Step S113306)

The monitoring unit 1133 calls the determination unit 1134. The argument to be delivered to the determination unit 1134 is a value (for example, 1) indicating that the difference in step S113304 exceeds the allowable threshold value 11442.

Figure 19:
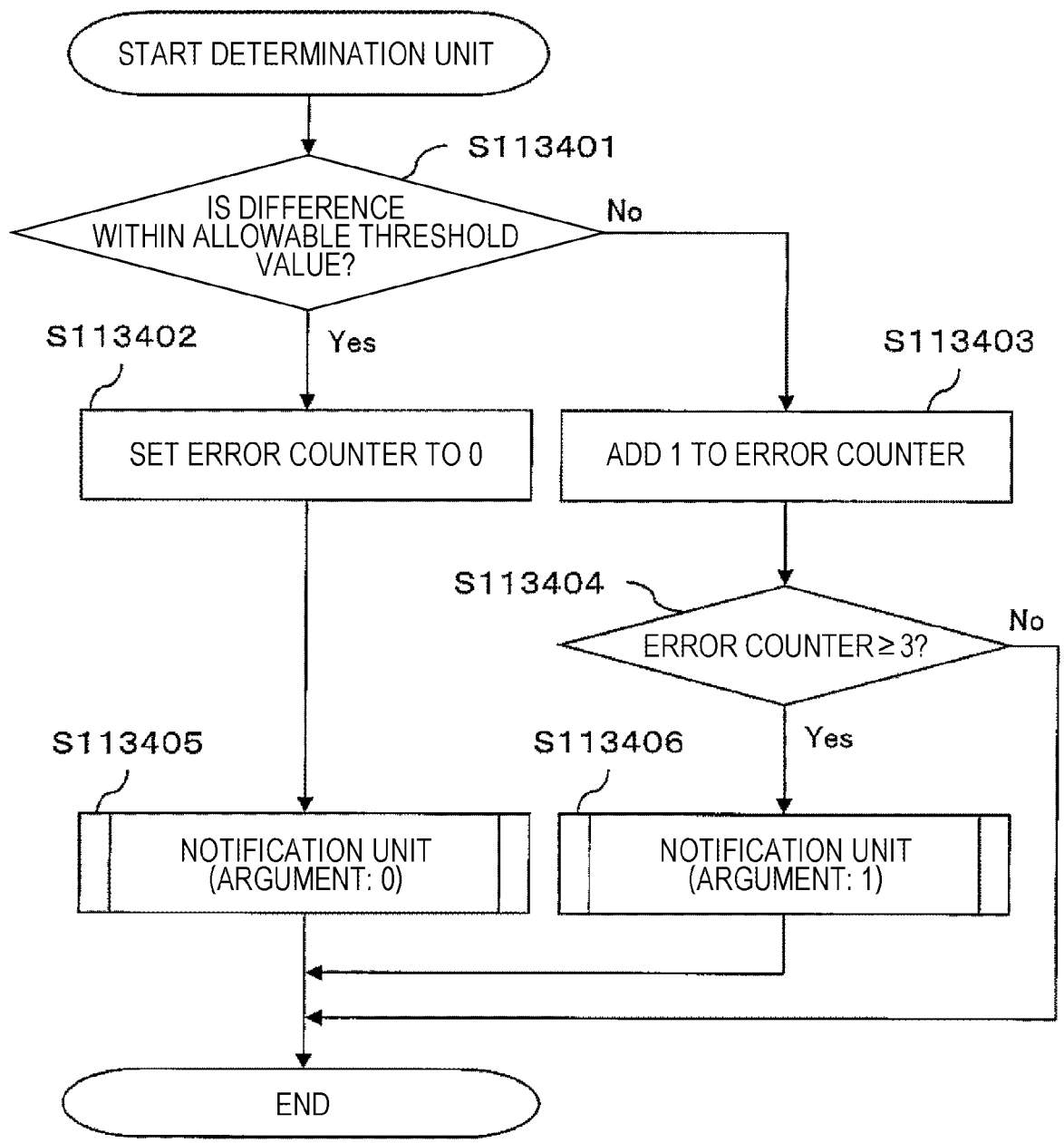
FIG. 19 is a flowchart describing an operation of a determination unit 1134.

FIG. 19 is a flowchart describing the operation of the determination unit 1134. Hereinafter, each step of FIG. 19 will be described.

(FIG. 19: Step S113401)

The determination unit 1134 determines whether the difference between the original data and the substitution data is within the allowable threshold value 11442. For example, it can be determined whether the delivered argument is 0. If it is within the allowable threshold value 11442, the process proceeds to step S113402; otherwise, the process proceeds to step S113403.

(FIG. 19: Step S113402)

The determination unit 1134 resets the error counter 1145 to 0.

(FIG. 19: Step S113403)

The determination unit 1134 adds 1 to the error counter 1145.

(FIG. 19: Step S113404)

The determination unit 1134 determines whether the error counter 1145 has reached a predetermined threshold value or more. When the error counter 1145 is the threshold value or more, it is regarded that the substitution has failed. In this flowchart, it is set to three times as an example. If the error counter 1145 is 3 or more, the process proceeds to step S113406; otherwise, this flowchart is ended.

(FIG. 19: Step S113405)

The determination unit 1134 calls the notification unit 1135. The argument to be delivered to the notification unit 1135 is set to a value (for example, 0) indicating that the substitution has succeeded.

(FIG. 19: Step S113406)

The determination unit 1134 calls the notification unit 1135. The argument to be delivered to the notification unit 1135 is set to a value (for example, 1) indicating that the substitution has failed.

Figure 20:
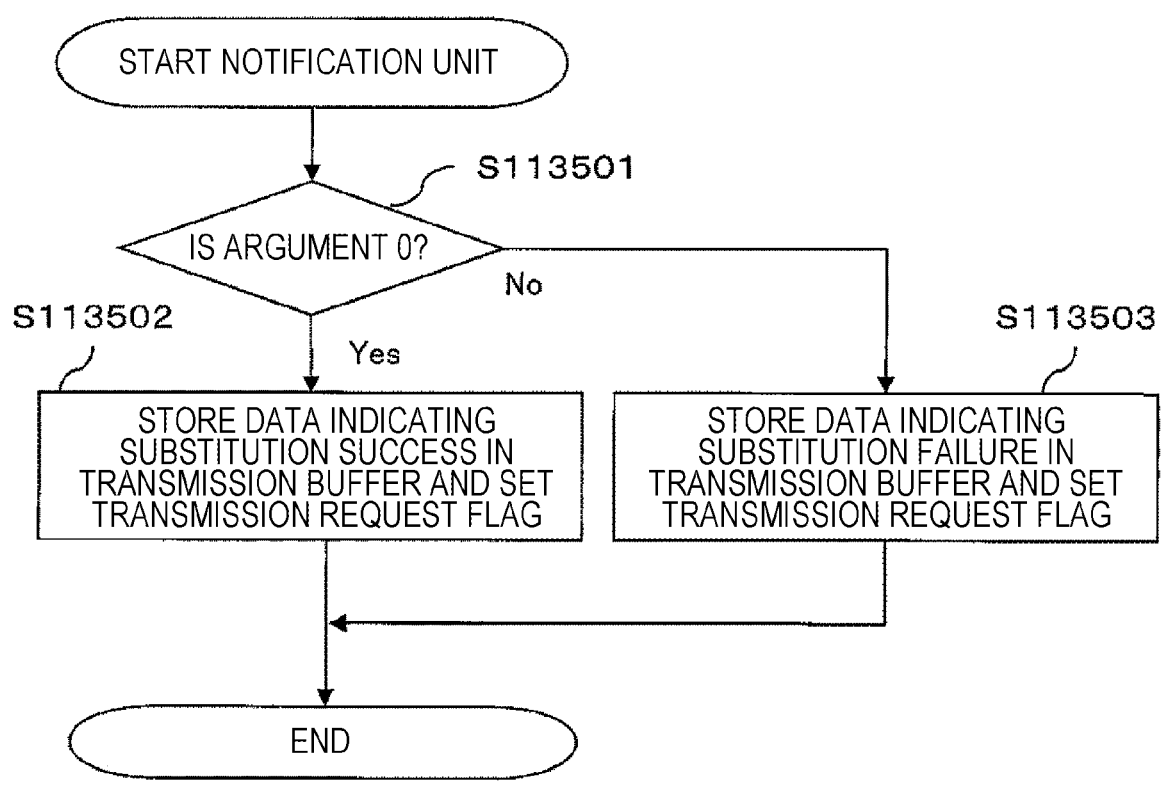
FIG. 20 is a flowchart describing an operation of a notification unit 1135.

FIG. 20 is a flowchart describing the operation of the notification unit 1135. Hereinafter, each step of FIG. 20 will be described.

(FIG. 20: Step S113501)

The notification unit 1135 checks whether the substitution has succeeded. For example, if the delivered argument is 0, it is successful, and if the delivered argument is 1 it is failed. If the substitution is successful, the process proceeds to step S113502; otherwise, the process proceeds to step S113503.

(FIG. 20: Step S113502)

The notification unit 1135 stores data for notifying that the function substitution has succeeded in the transmission buffer 1146. The data ID 11461 is a value previously assigned to data for notifying the success or failure of the substitution. The notification unit 1135 sets the transmission request flag 11463 of the stored data to 1.

(FIG. 20: Step S113503)

The notification unit 1135 stores data for notifying that the function substitution has failed in the transmission buffer 1146. The data ID 11461 is a value previously assigned to data for notifying the success or failure of the substitution. The notification unit 1135 sets the transmission request flag 11463 of the stored data to 1.

Figure 21:
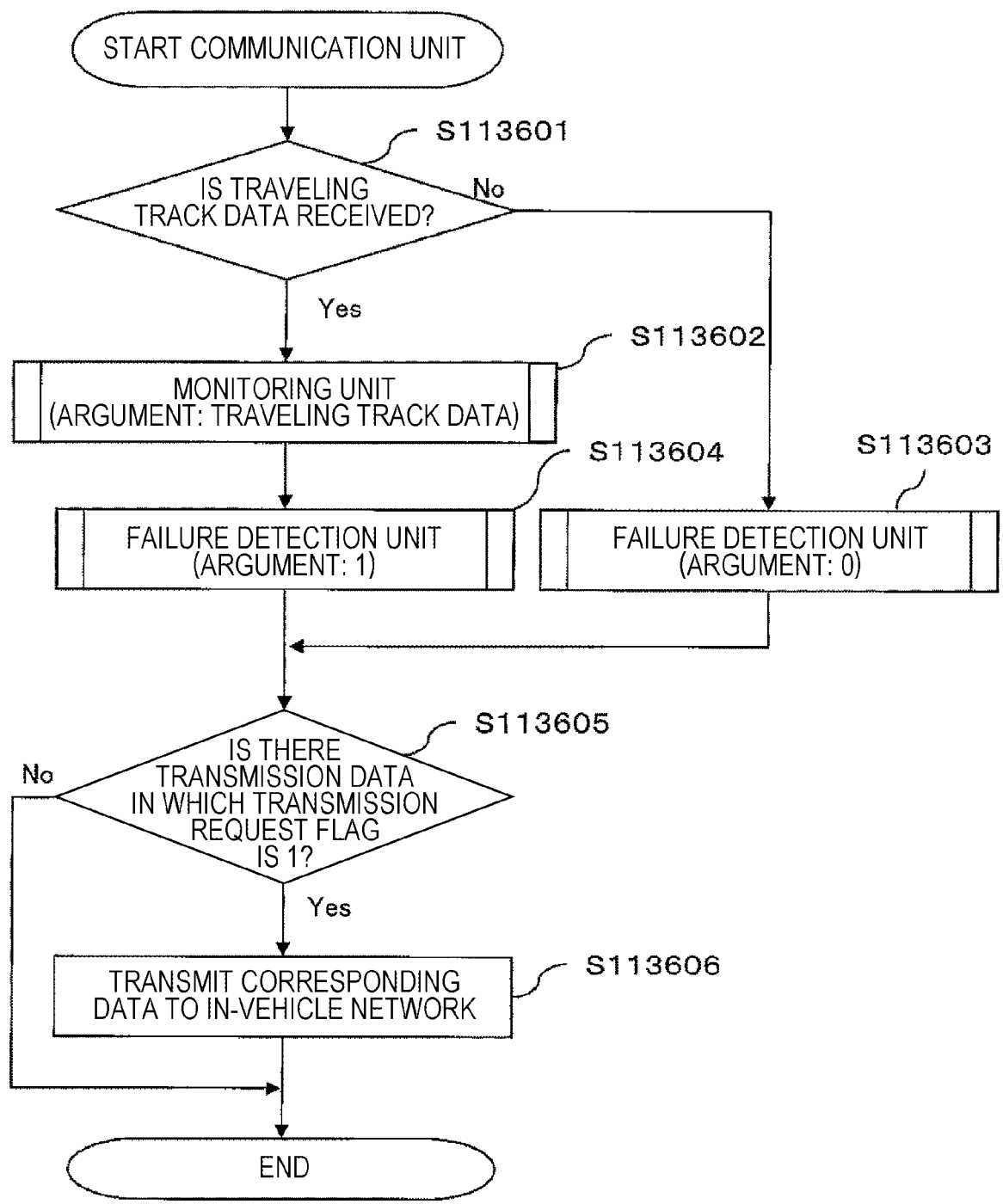
FIG. 21 is a flowchart describing an operation of a communication unit 1136.

FIG. 21 is a flowchart describing the operation of the communication unit 1136. The CPU 111 repeatedly executes this flowchart, for example, at a cycle assumed to have already received the traveling track data 1241 and 1341. Hereinafter, each step of FIG. 21 will be described.

(FIG. 21: Step S113601)

The communication unit 1136 checks whether the traveling track data 1241 or 1341 has been received. If received, the process proceeds to step S113602, and if not received, the process proceeds to step S113603.

(FIG. 21: Step S113602)

The communication unit 1136 calls the monitoring unit 1133 with the received traveling track data 1241 or 1341 as an argument.

(FIG. 21: Step S113603)

The communication unit 1136 calls the failure detection unit 1131 with a value (for example, 0) indicating that the traveling track data 1241 or 1341 is not received as an argument.

(FIG. 21: Step S113603: Supplement)

In this step, when the traveling track data 1241 or 1341 is not received, the failure detection unit 1131 is immediately called, but the present invention is not limited thereto. For example, the number of times of not being received may be counted, and the failure detection unit 1131 may be called when the count value reaches a certain value or more.

(FIG. 21: Step S113604)

The communication unit 1136 calls the failure detection unit 1131 with a value (for example, 1) indicating that the traveling track data 1241 or 1341 is received as an argument.

(FIG. 21: Step S113605)

The communication unit 1136 checks whether there is data in which the transmission request flag 11463 of the transmission buffer 1146 is set to 1. If there is the data, the process proceeds to step S113606, and if there is no data, this flowchart is ended.

(FIG. 21: Step S113606)

The communication unit 1136 transmits, to the in-vehicle network 16, the data in which the transmission request flag 11463 is set to 1. The communication unit 1136 resets the transmission request flag 11463 corresponding to the transmitted data to 0.

Figure 22:
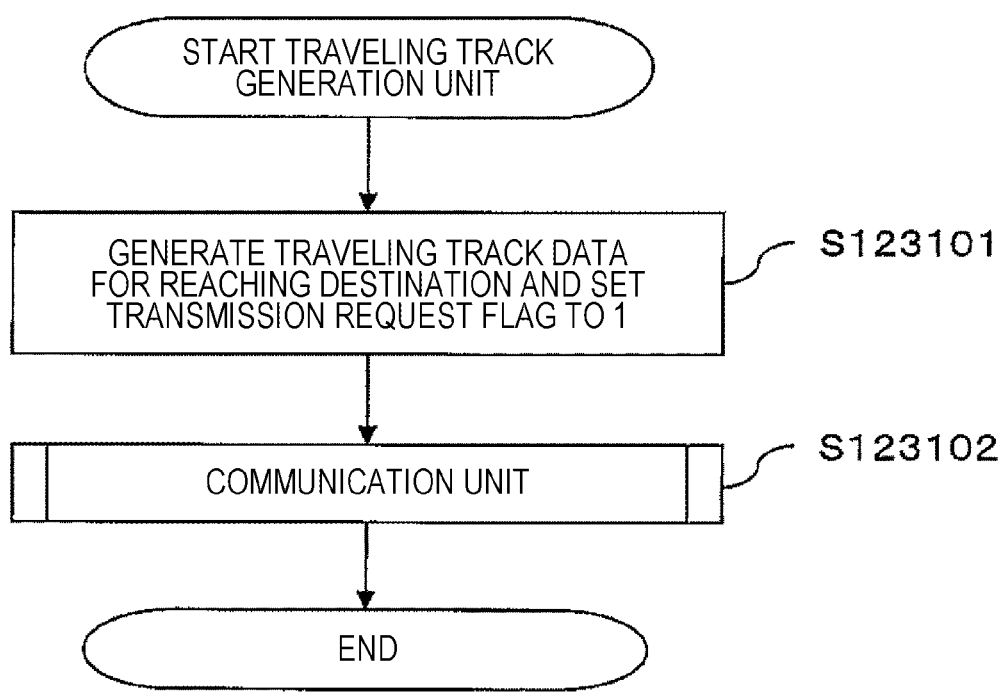
FIG. 22 is a flowchart describing an operation of a traveling track generation unit 1231.

FIG. 22 is a flowchart describing the operation of the traveling track generation unit 1231. The CPU 121 executes this flowchart, for example, periodically. Hereinafter, each step of FIG. 22 will be described.

(FIG. 22: Step S123101)

The traveling track generation unit 1231 generates the traveling track data 1241 necessary for reaching the destination and sets the transmission request flag 1242 to 1.

(FIG. 22: Step S123102)

The traveling track generation unit 1231 calls the communication unit 1232.

Figure 23:
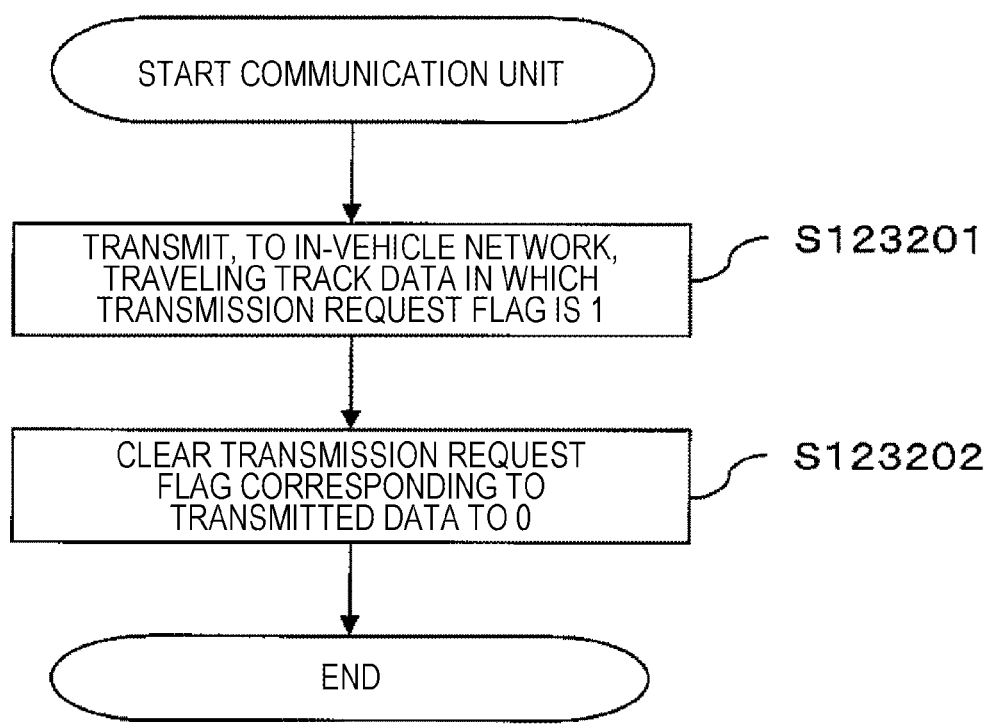
FIG. 23 is a flowchart describing an operation of a communication unit 1232.

FIG. 23 is a flowchart describing the operation of the communication unit 1232. Hereinafter, each step of FIG. 23 will be described.

(FIG. 23: Step S123201)

The communication unit 1232 transmits, to the in-vehicle network 16, the traveling track data 1241 in which the transmission request flag 1242 is set to 1.

(FIG. 23: Step S123202)

The communication unit 1232 clears the transmission request flag 1242 corresponding to the transmitted data to 0.

Figure 24:
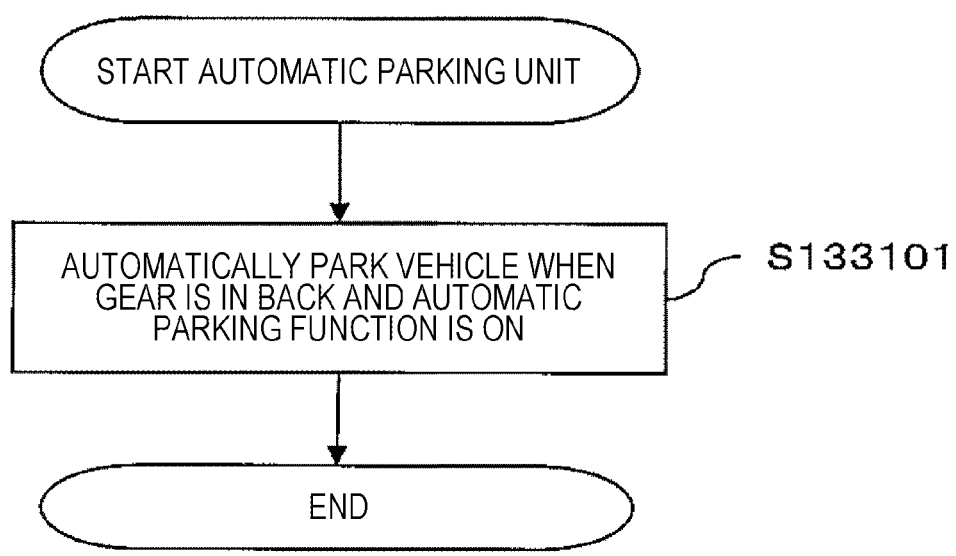
FIG. 24 is a flowchart describing an operation of an automatic parking unit 1331.

FIG. 24 is a flowchart describing the operation of the automatic parking unit 1331. The CPU 131 executes this flowchart, for example, when a driver instructs an automatic driving. Hereinafter, each step of FIG. 24 will be described.

(FIG. 24: Step S133101)

When the gear of the vehicle is in the back and the automatic parking function is on, the automatic parking unit 1331 automatically parks the vehicle without depending on the operation by the driver.

Figure 25:
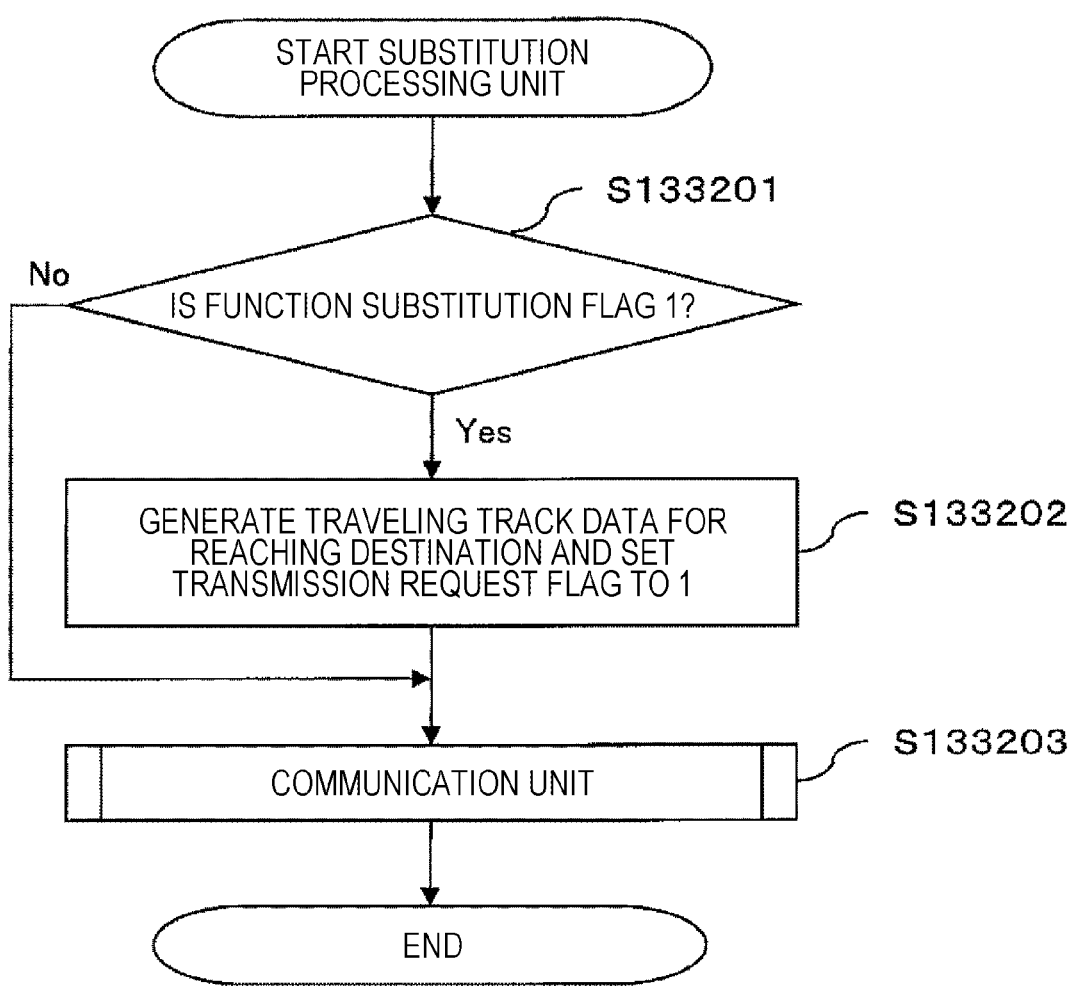
FIG. 25 is a flowchart describing an operation of a substitution processing unit 1332.

FIG. 25 is a flowchart describing the operation of the substitution processing unit 1332. Hereinafter, each step of FIG. 25 will be described.

(FIG. 25: Step S133201)

The substitution processing unit 1332 checks whether the function substitution flag 1342 is 1. If 1, the process proceeds to step S133202; otherwise, the process proceeds to step S133203.

(FIG. 25: Step S133202)

The substitution processing unit 1332 generates the traveling track data 1341 necessary for reaching the destination and sets the transmission request flag 1343 to 1.

(FIG. 25: Step S133202: Supplement)

The substitution processing unit 1332 may perform the process of generating the traveling track data 1341 at the same function level as the traveling track generation unit 1231, or may perform the process of generating the traveling track data 1341 at a lower function level. The function level used herein is a control parameter corresponding to the usefulness of the traveling track data, such as the number of operation sequences, accuracy, and the like. When the function level of the substitution processing unit 1332 is dropped below the traveling track generation unit 1231, it is possible to minimize an increase in the level of safety.

(FIG. 25: Step S133203)

The substitution processing unit 1332 calls the communication unit 1333.

Figure 26:
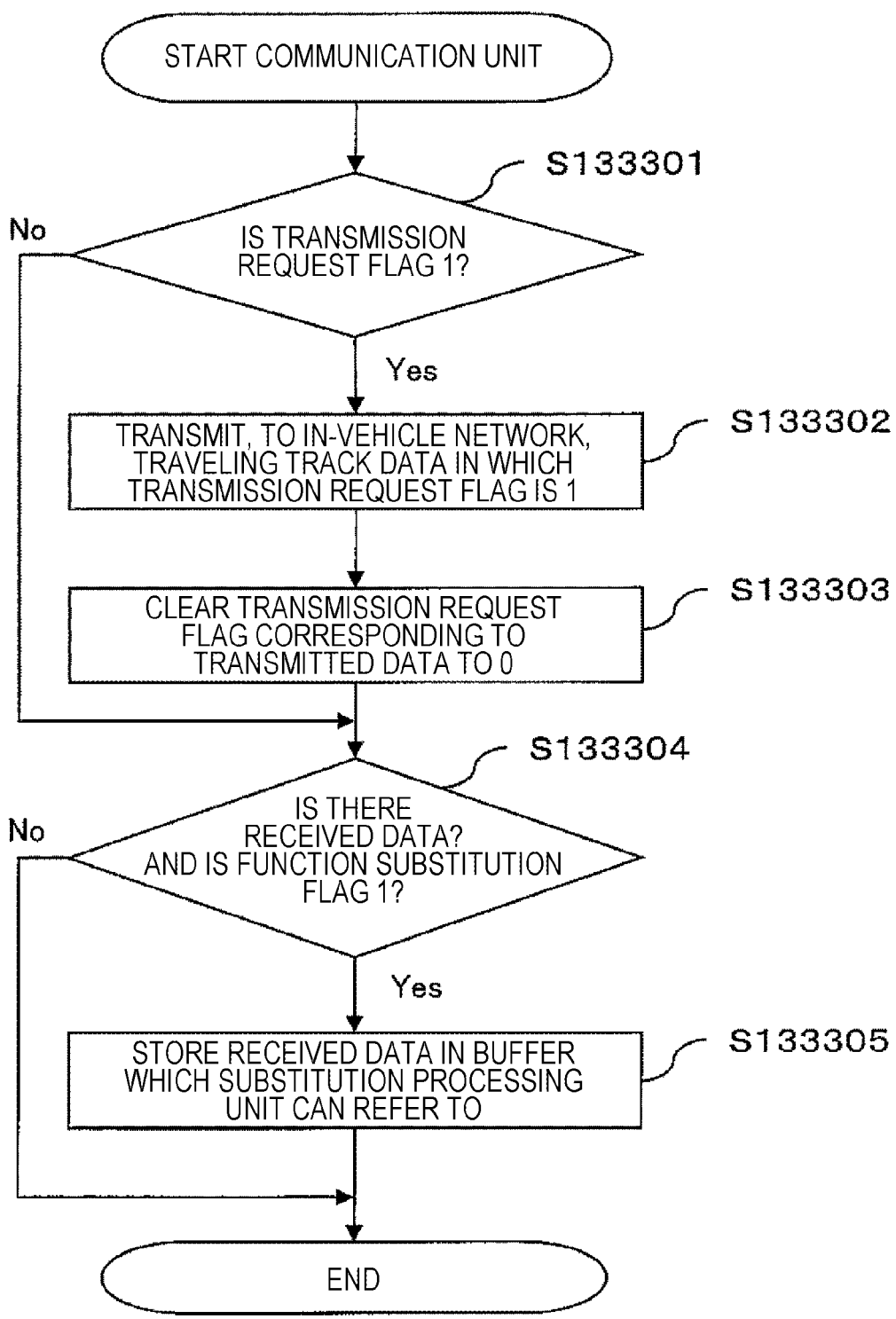
FIG. 26 is a flowchart describing an operation of a communication unit 1333.

FIG. 26 is a flowchart describing the operation of the communication unit 1333. Hereinafter, each step of FIG. 26 will be described.

(FIG. 26: Step S133301)

The communication unit 1333 checks whether the transmission request flag 1343 is 1. If 1, the process proceeds to step S133302; otherwise, the process proceeds to step S133304.

(FIG. 26: Step S133302)

The communication unit 1333 transmits, to the in-vehicle network 16, the traveling track data 1341 in which the transmission request flag 1343 is set to 1.

(FIG. 26: Step S133303)

The communication unit 1333 clears the transmission request flag 1343 corresponding to the transmitted data to 0.

(FIG. 26: Step S133304)

The communication unit 1333 checks whether there is the received navigation data and the function substitution flag 1342 is 1. If these conditions are satisfied, the process proceeds to step S133305; otherwise, this flowchart is ended.

(FIG. 26: Step S133305)

The communication unit 1333 stores the received data in a buffer which the substitution processing unit 1332 can refer to.

Figure 27:
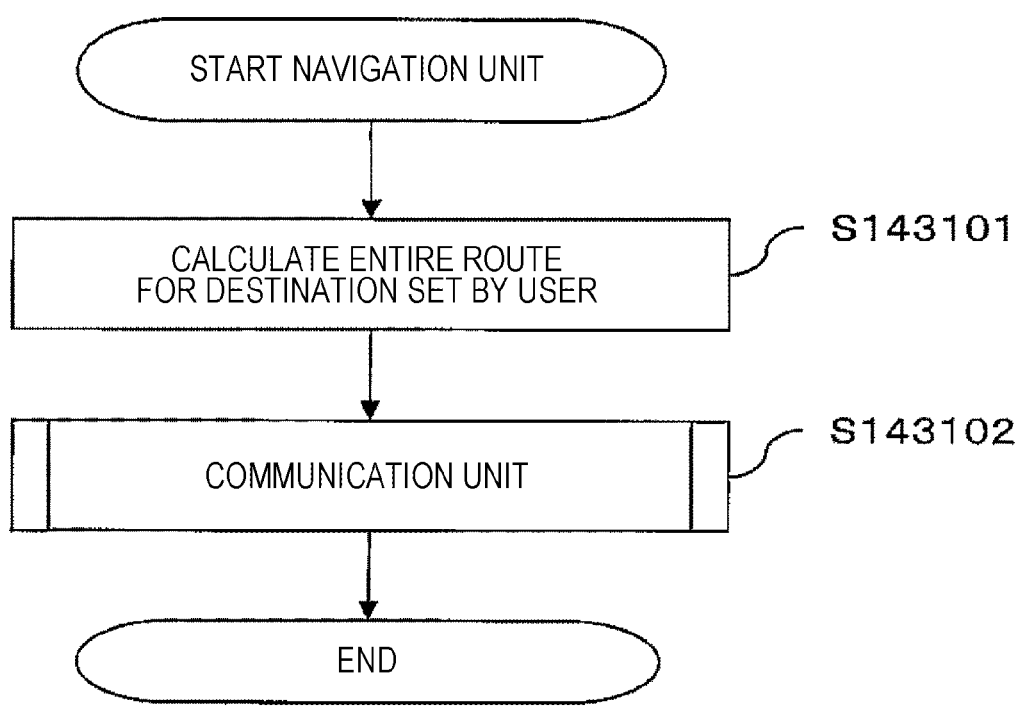
FIG. 27 is a flowchart describing an operation of a navigation unit 1431.

FIG. 27 is a flowchart describing the operation of the navigation unit 1431. The CPU 141 executes this flowchart, for example, periodically. Hereinafter, each step of FIG. 27 will be described.

(FIG. 27: Step S143101)

The navigation unit 1431 calculates the entire route for reaching the destination set by the user.

(FIG. 27: Step S143102)

The navigation unit 1431 calls the communication unit 1432 with the current map of the surroundings of the vehicle, the destination, and the traveling route as the argument.

Figure 28:
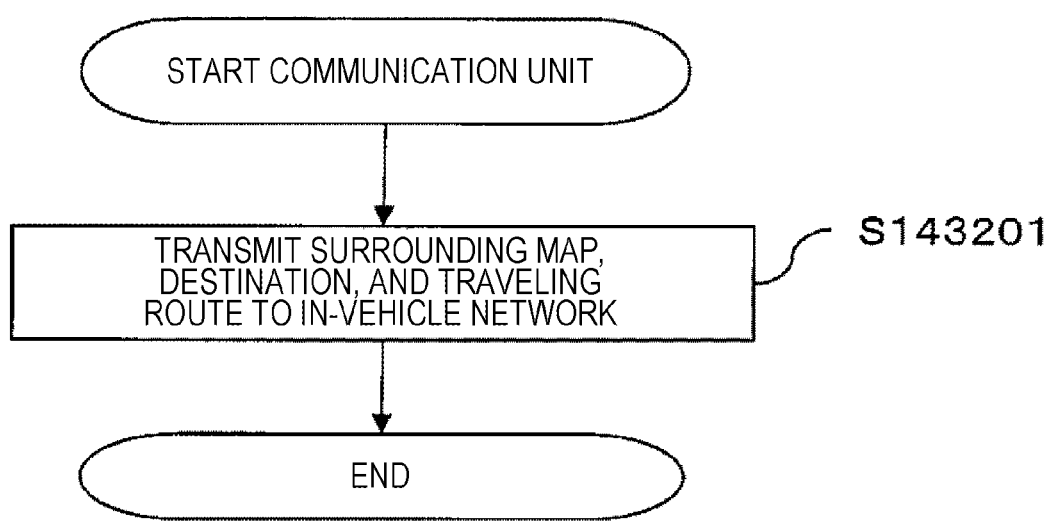
FIG. 28 is a flowchart describing an operation of a communication unit 1432.

FIG. 28 is a flowchart describing the operation of the communication unit 1432. Hereinafter, each step of FIG. 28 will be described.

(FIG. 28: Step S143201)

The communication unit 1432 transmits, to the in-vehicle network 16, the navigation data, such as the surrounding map, the destination, the traveling route, and the like, which are delivered as the argument.

(FIG. 28: Step S143201: Supplement)

In this step, the navigation ECU 14 voluntarily transmits the navigation data to the in-vehicle network 16 to support initialization of function substitution, but is not limited thereto. For example, the navigation data may be transmitted in response to the substitution request.

Figure 29:
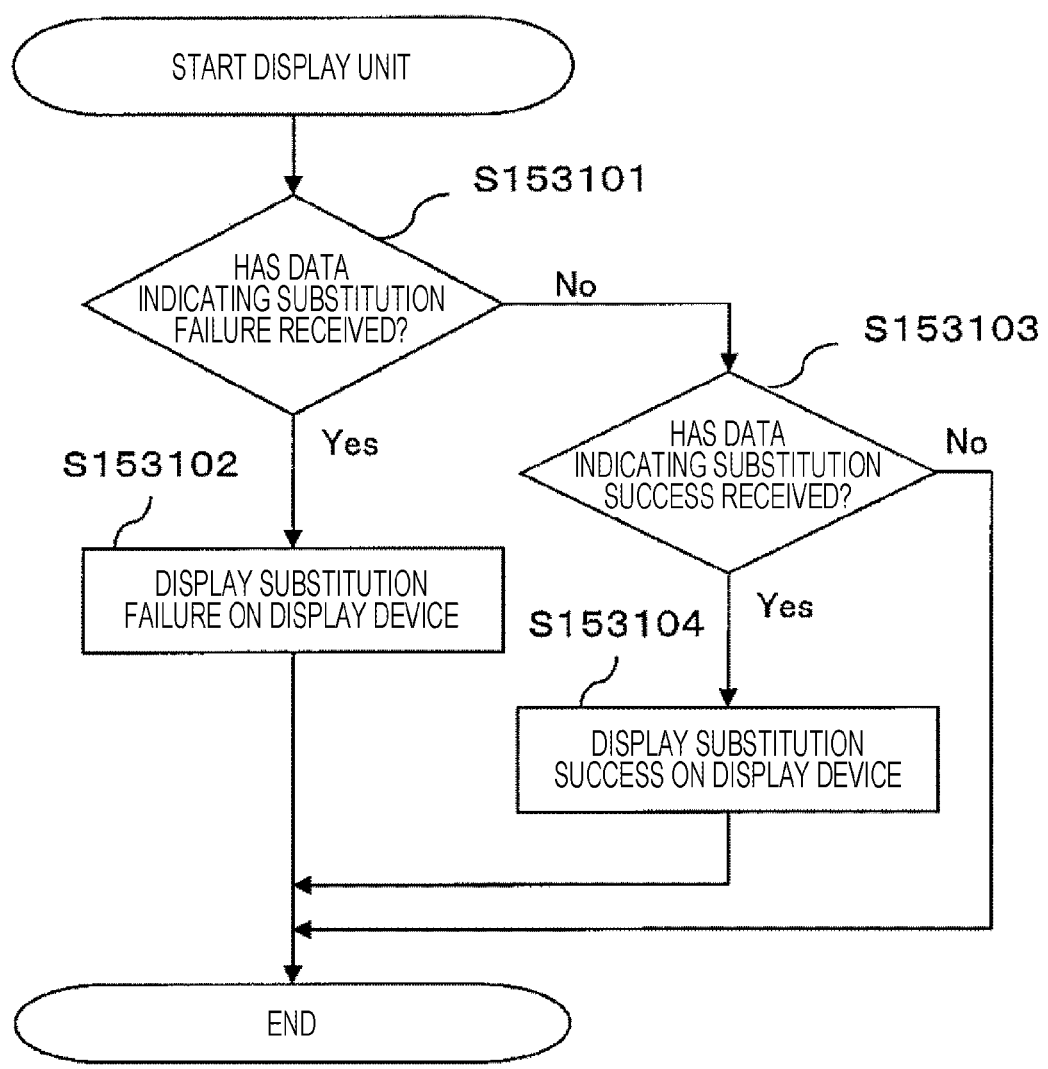
FIG. 29 is a flowchart describing an operation of a display unit 1531.

FIG. 29 is a flowchart describing the operation of the display unit 1531. Hereinafter, each step of FIG. 29 will be described.

(FIG. 29: Step S153101)

The display unit 1531 checks whether data indicating that the substitution has failed (for example, data having a value of 1) has been received. If received, the process proceeds to step S153102; otherwise, the process proceeds to step S153103.

(FIG. 29: Step S153102)

The display unit 1531 displays on the display device 156 that the automatic parking ECU 13 has failed to execute the function in place of the automatic driving integrated ECU 12.

(FIG. 29: Step S153103)

The display unit 1531 checks whether data indicating that the substitution has succeeded (for example, data having a value of 0) has been received. If received, the process proceeds to step S153104; otherwise, this flowchart is ended.

(FIG. 29: Step S153104)

The display unit 1531 displays on the display device 156 that the automatic parking ECU 13 has succeeded to execute the function in place of the automatic driving integrated ECU 12.

Figure 30:
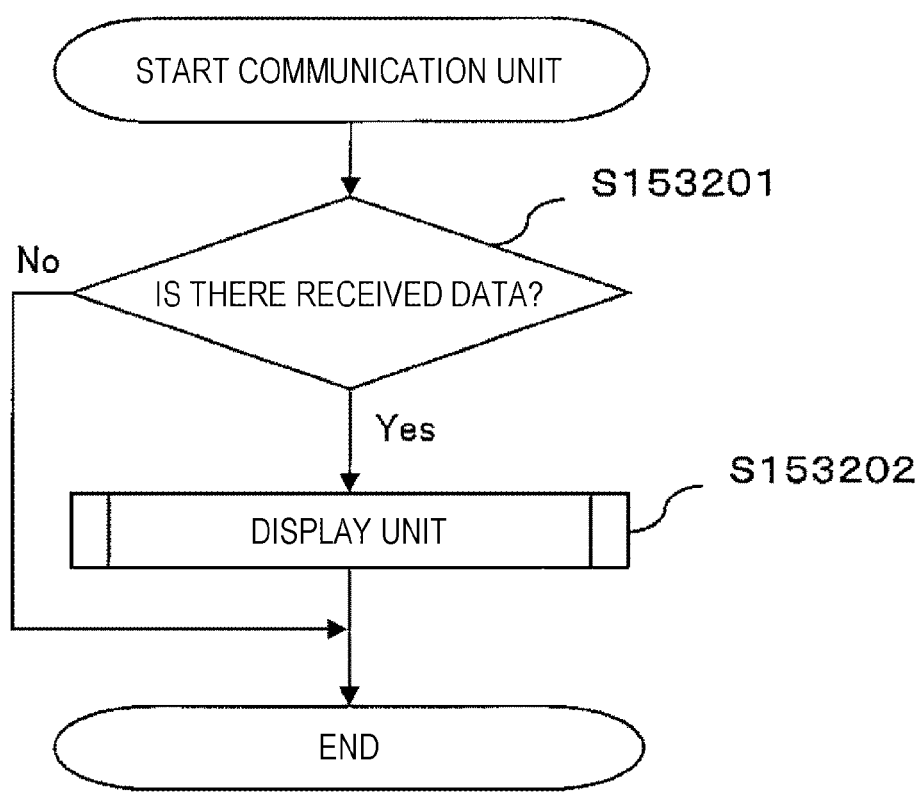
FIG. 30 is a flowchart describing an operation of a communication unit 1532.

FIG. 30 is a flowchart describing the operation of the communication unit 1532. The CPU 151 can notify the driver of the vehicle of the success or failure of the substitution, for example, by periodically executing the flowchart. Hereinafter, each step of FIG. 30 will be described.

(FIG. 30: Step S153201)

The communication unit 1532 checks whether there is the received data. If there is the received data, the process proceeds to step S153202, and if there is no received data, this flowchart is ended.

(FIG. 30: Step S153202)

The communication unit 1532 calls the display unit 1531.

First Embodiment: Summary

The vehicle control system 1 according to the first embodiment can determine whether the automatic parking ECU 13 has succeeded in the function substitution by comparing the control parameters before and after the start of substitution. Therefore, it is suitable for an automatic driving system which requires high reliability.

In the vehicle control system 1 according to the first embodiment, since the functions are made redundant by the function substitution between the ECUs, there is no need to make the ECU body redundant. Therefore, a highly reliable system can be constructed at a low cost.

Second Embodiment

Figure 31:
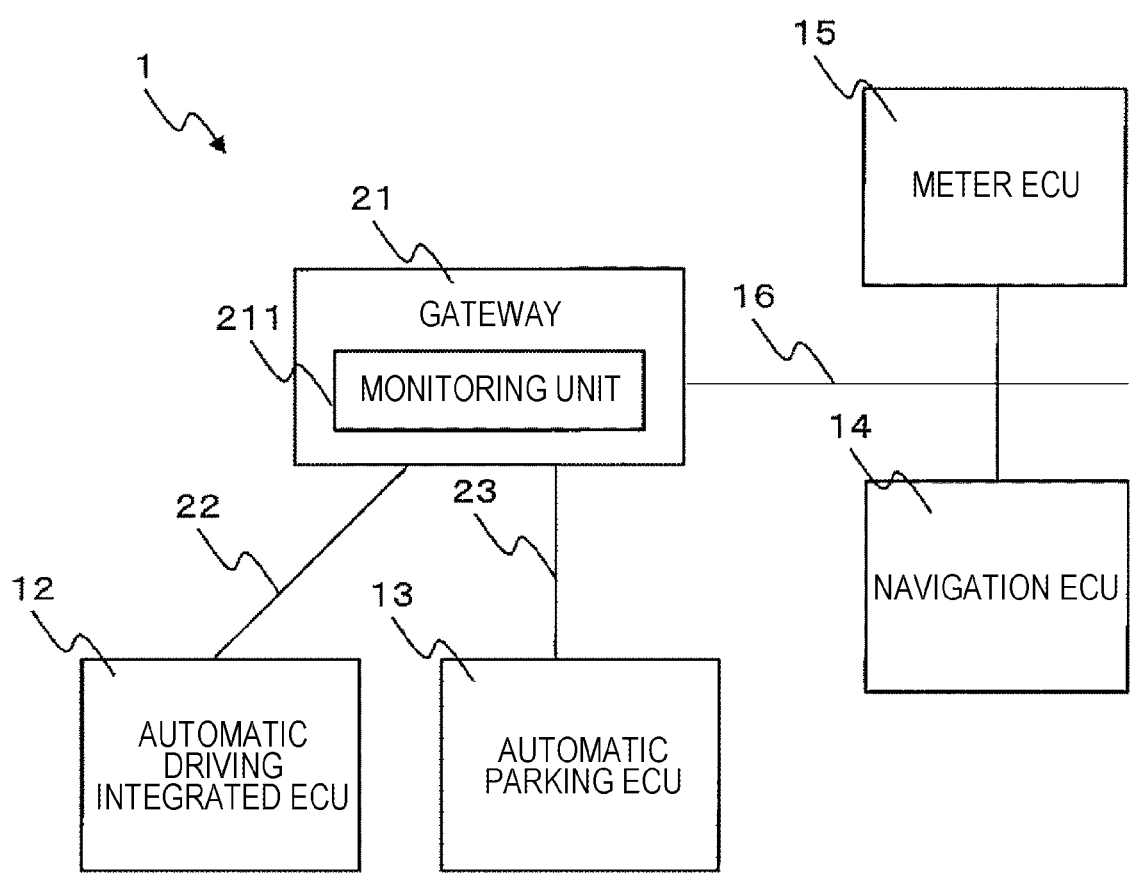
FIG. 31 is a configuration diagram of a vehicle control system 1 according to a second embodiment.

FIG. 31 is a configuration diagram of a vehicle control system 1 according to a second embodiment of the present invention. A gateway 21 includes a monitoring unit 211 having the same configuration as the monitoring device 11 described in the first embodiment and has a role of relaying communication in an in-vehicle network.

In the second embodiment, a meter ECU 15 and a navigation ECU 14 are connected to an in-vehicle network 16, an automatic driving integrated ECU 12 is connected to an in-vehicle network 22, and an automatic parking ECU 13 is connected to an in-vehicle network 23. Each in-vehicle network is connected through a gateway 21, and the gateway 21 can mutually communicate by relaying communication data. The in-vehicle network 22 and the in-vehicle network 23 are one-to-one communication networks such as Ethernet (registered trademark).

When it is determined that the automatic parking ECU 13 has failed in the function substitution, the gateway 21 may not transmit all the data transmitted from the automatic parking ECU 13. For example, even if the traveling track data 1341 is received, it can be discarded without being transmitted. Therefore, an influence range of abnormal data can be kept to a minimum.

After the automatic parking ECU 13 starts the function substitution (or after issuing the substitution request), the gateway 21 may change a routing table so that the data transmitted to the automatic driving integrated ECU 12 is transmitted to the automatic parking ECU 13 at the time before the automatic driving integrated ECU 12 fails. Therefore, the function substitution can be started smoothly.

In the vehicle control system 1 according to the second embodiment, the gateway 21 controls the relay destination of the communication data, thereby smoothly starting the function substitution, or when the substitution fails, the influence on other ECUs can be minimized.

Third Embodiment

Figure 32:
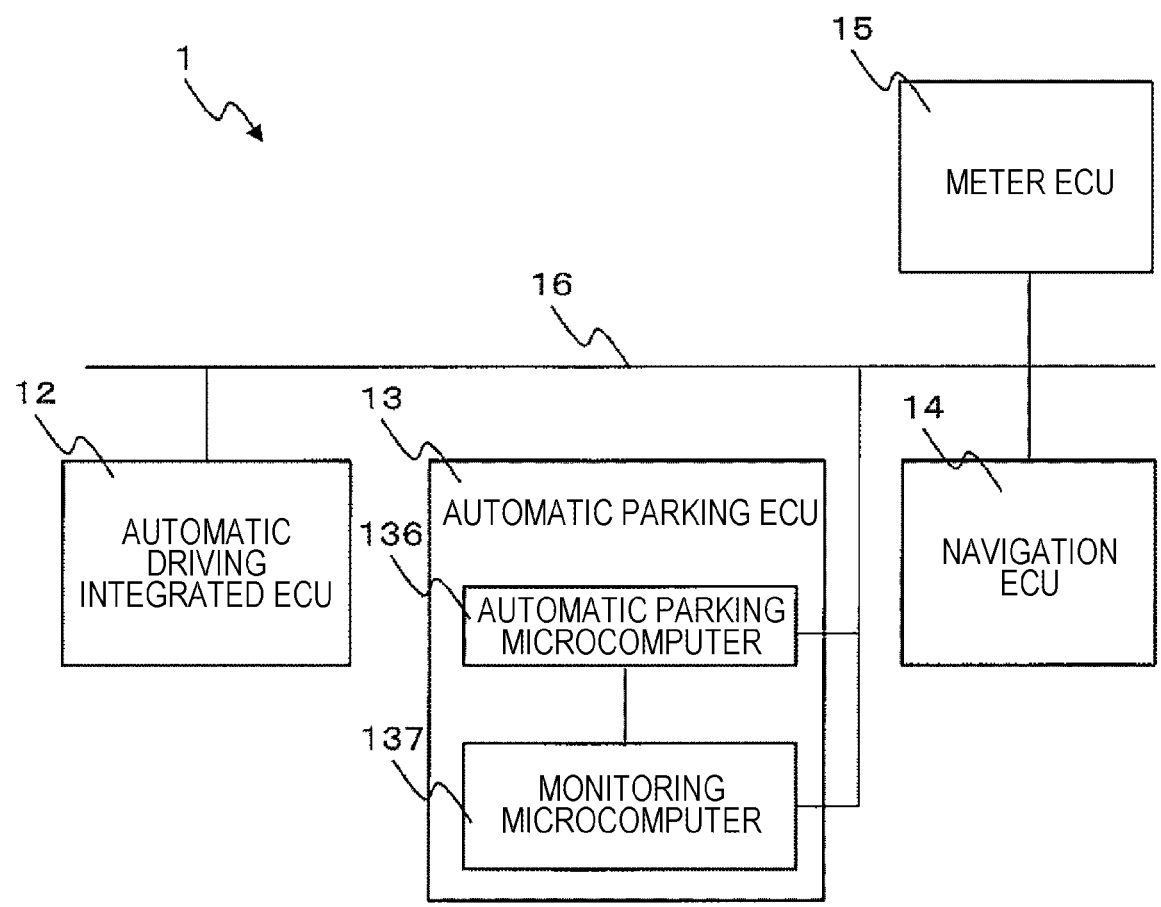
FIG. 32 is a configuration diagram of a vehicle control system 1 according to a third embodiment.

FIG. 32 is a configuration diagram of a vehicle control system 1 according to a third embodiment of the present invention. In the third embodiment, an automatic parking ECU 13 includes an automatic parking microcomputer 136 and a monitoring microcomputer 137. These microcomputers are connected by, for example, a serial line.

The automatic parking microcomputer 136 is a microcomputer having the same function as that of the automatic parking ECU 13 described in the first embodiment. The monitoring microcomputer 137 is a microcomputer having the same function as that of the monitoring device 11 described in the first embodiment.

In the vehicle control system 1 according to the third embodiment, since the monitoring microcomputer 137 is provided in the automatic parking ECU 13 to realize the same function as that of the monitoring device 11, it is possible to realize the equivalent function at a lower cost than constructing the monitoring device 11 as an independent ECU.

Modification of the Present Invention

The present invention is not limited to the above-described embodiments and various modifications can be made thereto. For example, the embodiments have been described in detail for easy understanding of the present invention and are not intended to limit the present invention to those necessarily including all the above-described configurations. In addition, a part of a configuration of a certain embodiment can be replaced with a configuration of another embodiment, and a configuration of another embodiment can be added to a configuration of a certain embodiment. In addition, it is possible to add, remove, or replace another configuration with respect to a part of a configuration of each embodiment.

In the above embodiments, the function substitution target is the traveling track generation unit 1231, but the ECU or other function units can be the function substitution target. For example, in a system in which an actuator is directly connected to the in-vehicle network 16, if an engine control ECU fails, a similar function substitution can be performed. In addition, two or more function units can be targeted for the function substitution. In this case, the state data 1141 can be provided for each function targeted for the function substitution. The same applies to the allowable threshold value 11442, the error counter 1145, the function substitution flag 1342, and the like.

In the above embodiments, it is assumed that the vehicle travels along the traveling track at the center of the road, but the present invention is not limited thereto. In addition, the traveling track data 1241 (and 1341) is expressed as described in FIGS. 8 and 9, but the expression form is not limited thereto. For example, it is possible to express a traveling track by describing a temporal change of a vehicle position in an absolute coordinate format, or to express a traveling track based on a grid map format.

In the above embodiments, the traveling track data 1241 and 1341 are compared so as to determine the success or failure of the substitution to the automatic driving function, but the present invention is not limited thereto. For example, it is also possible to compare a control plan of a target torque.

In the above embodiments, the allowable threshold value 11442 is set as a constant, but the present invention is not limited thereto. For example, it is also possible to measure the elapsed time since the failure of the automatic driving integrated ECU 12 and to dynamically calculate the allowable threshold value 11442 according to the elapsed time.

In FIG. 12, for convenience of description, a data length is omitted, but when the transmission data exceeds a maximum packet size of the in-vehicle network 16, the transmission data may be divided into a plurality of packets and then transmitted.

In the above embodiments, the transmission request flag is used within the range necessary for describing the present invention. However, when transmitting other data to the in-vehicle network 16, the transmission request flag can be provided for each data.

In the above embodiments, the ECU requesting the function substitution is fixed to the automatic parking ECU 13, but the present invention is not limited thereto. For example, another ECU may be requested for function substitution according to a situation of a computational load or the like.

In the above embodiments, the automatic parking ECU 13 is provided with the substitution processing unit 1332 in advance, but the present invention is not limited thereto. For example, by transmitting a program during the execution of the system, the substitution destination ECU may be provided with a substitution function.

In the above embodiments, an example in which the function substitution is performed between the ECUs has been described. However, in a case where the same ECU has a plurality of CPUs, when one of the CPUs fails, a configuration similar to that of the present invention can be used to a case where another CPU executes the function substitution in place of the failed CPU. For example, the ECU can have a configuration similar to that of the monitoring device 11, and it is possible to determine the success or failure of the function substitution.

REFERENCE SIGNS LIST

1 vehicle control system
11 monitoring device
12 automatic driving integrated ECU
13 automatic parking ECU
14 navigation ECU
15 meter ECU
16 in-vehicle network
21 gateway

The invention claimed is:

1. A vehicle control device connected to first and second computing units which are configured to control an operation of a vehicle, the vehicle control device comprising:
 a monitoring unit which is configured to monitor an operation in which, when the first computing unit fails, the second computing unit is configured to perform substitution of a control computation to be executed by the first computing unit in place of the first computing unit, wherein the monitoring unit is configured to monitor the operation of the substitution by comparing a computing result output by the first computing unit before the failure of the first computing unit with a computing result output by the second computing unit in place of the first computing unit after the failure of the first computing unit; and
 a determination unit which is configured to determine whether the second computing unit has succeeded in the substitution based on a monitoring result by the monitoring unit, wherein the determination unit is configured to determine success or failure of the substitution based on a comparison result by the monitoring unit.

2. The vehicle control device according to claim 1, wherein
 the monitoring unit is configured to monitor the operation of the substitution based on whether a difference between a computing result output by the first computing unit and a computing result output by the second computing unit is within a threshold value, and
 the monitoring unit is configured to use, as the threshold value, an amount by which the computing result output by the first computing unit changes during a period from a time when the first computing unit fails to a time in which the second computing unit starts the substitution.

3. The vehicle control device according to claim 1, wherein, when the determination unit determines that the second computing unit has failed in the substitution, the determination unit is configured to transmit a message notifying the failure of the substitution to an in-vehicle network provided in the vehicle.

4. The vehicle control device according to claim 1, wherein
 the monitoring unit is configured to continuously monitor the operation in which the second computing unit performs the substitution, and
 when the second computing unit has failed in the substitution a predetermined number of times or more, the determination unit is configured to transmit a message notifying the failure of the substitution to an in-vehicle network provided in the vehicle.

5. The vehicle control device according to claim 1, wherein the first computing unit is configured to compute a parameter defining an automatic driving plan of the vehicle by the control computation.

6. A vehicle control system comprising:
a vehicle control device connected to first and second computing units which are configured to control an operation of a vehicle;
an in-vehicle network which is configured to connect the first computing unit, the second computing unit, and the vehicle control device; and
a gateway which is configured to relay communication in the in-vehicle network,
wherein the vehicle control device comprises:
a monitoring unit which is configured to monitor an operation in which, when the first computing unit fails, the second computing unit is configured to perform substitution of a control computation to be executed by the first computing unit in place of the first computing unit, wherein the monitoring unit is configured to monitor the operation of the substitution by comparing a computing result output by the first computing unit before the failure of the first computing unit with a computing result output by the second computing unit in place of the first computing unit after the failure of the first computing unit; and
a determination unit which is configured to determine whether the second computing unit has succeeded in the substitution based on a monitoring result by the monitoring unit, wherein the determination unit is configured to determine success or failure of the substitution based on a comparison result by the monitoring unit.

7. A vehicle control system comprising:
a vehicle control device connected to first and second computing units which are configured to control an operation of a vehicle;
an in-vehicle network which is configured to connect the first computing unit, the second computing unit, and the vehicle control device; and
a gateway which is configured to relay communication in the in-vehicle network,
wherein the vehicle control device comprises:
a monitoring unit which is configured to monitor an operation in which, when the first computing unit fails, the second computing unit is configured to perform substitution of a control computation to be executed by the first computing unit in place of the first computing unit; and
a determination unit which is configured to determine whether the second computing unit has succeeded in the substitution based on a monitoring result by the monitoring unit, wherein, when the second computing unit starts the substitution, the gateway is configured to rewrite a routing table defining a communication path in the in-vehicle network so that communication data to be received by the first computing unit reaches the second computing unit.

8. The vehicle control system according to claim 6, wherein
the monitoring unit is configured to monitor the operation of the substitution based on whether a difference between a computing result output by the first computing unit and a computing result output by the second computing unit is within a threshold value, and
when the difference is not within the threshold value, the relay is configured to not relay the computing result output by the substitution of the second computing unit.

9. The vehicle control system according to claim 6, wherein the second computing unit is configured to perform the substitution at a function level lower than a function level of the first computing unit.

10. The vehicle control system according to claim 6, wherein, when the determination unit determines that the second computing unit has failed in the substitution, the determination unit is configured to transmit a message notifying the failure of the substitution to a driver of the vehicle.

11. The vehicle control device according to claim 1, wherein
the monitoring unit is configured to monitor the operation of the substitution based on whether a difference between a computing result output by the first computing unit and a computing result output by the second computing unit is within a threshold value, and
the monitoring unit is configured to use, as the threshold value, a first amount larger than a second amount by which the computing result output by the first computing unit changes during a period from a time when the first computing unit fails to a time in which the second computing unit starts the substitution.

* * * * *